United States Patent
Nishioka

(10) Patent No.: US 8,576,704 B2
(45) Date of Patent: Nov. 5, 2013

(54) COMMUNICATION SYSTEM, COMMUNICATION DEVICE, INTEGRATED CIRCUIT, AND COMMUNICATION METHOD

(75) Inventor: Shinichiro Nishioka, Osaka (JP)

(73) Assignee: Panasonic Corporation, Osaka (JP)

( * ) Notice: Subject to any disclaimer, the term of this patent is extended or adjusted under 35 U.S.C. 154(b) by 345 days.

(21) Appl. No.: 13/059,263

(22) PCT Filed: Mar. 17, 2010

(86) PCT No.: PCT/JP2010/001906
§ 371 (c)(1),
(2), (4) Date: Feb. 16, 2011

(87) PCT Pub. No.: WO2010/119616
PCT Pub. Date: Oct. 21, 2010

(65) Prior Publication Data
US 2011/0141898 A1    Jun. 16, 2011

(30) Foreign Application Priority Data

Apr. 15, 2009   (JP) .................................. 2009-098678

(51) Int. Cl.
*G01R 31/08*     (2006.01)
(52) U.S. Cl.
USPC ........................................................ 370/223
(58) Field of Classification Search
USPC .................................. 370/216–228, 400–408
See application file for complete search history.

(56) References Cited

U.S. PATENT DOCUMENTS 6,141,349 A     10/2000  Ikeda et al.
2005/0027876 A1*  2/2005  Umei et al. ................... 709/231

FOREIGN PATENT DOCUMENTS

| JP | 4-297169 | 10/1992 |
|---|---|---|
| JP | 11-355335 | 12/1999 |
| JP | 2000-32020 | 1/2000 |
| JP | 2005-45521 | 2/2005 |
| JP | 2005-65216 | 3/2005 |

OTHER PUBLICATIONS

International Search Report issued Jun. 8, 2010 in International (PCT) Application No. PCT/JP2010/001906.

* cited by examiner

*Primary Examiner* — Jeffrey M Rutkowski
*Assistant Examiner* — Peter Mak
(74) *Attorney, Agent, or Firm* — Wenderoth, Lind & Ponack, L.L.P.

(57) ABSTRACT

A communication system includes communication devices that are connected with one another in a ring via a serial link. In the communication system, one communication device issues a standby packet for causing each communication device connected to a part of the link that is not involved with data transfer to switch to standby mode. Each communication device connected to this part of the link relays the standby packet from an immediately preceding communication device in the link to an immediately succeeding communication device in the link, and after relaying the standby packet, causes the own device to switch to standby mode. Further, a communication device that performs communication with said one communication device issues a loopback packet for causing each communication device connected to a part of the link that is involved with data transfer to switch to loopback mode. Each communication device connected to this part of the link relays the loopback packet from an immediately preceding communication device in the link to an immediately succeeding communication device in the link, and after relaying the loopback packet, causes the own device to switch to loopback mode.

12 Claims, 20 Drawing Sheets

Packet format

Payload format (command)

Payload format (response)

Payload format (data)

Payload format (device list)

Payload format (flow control)

Payload format (polling)

FIG. 4

| K code | Symbol | Function | Original data (hexadecimal) | Current RD − | Current RD + |
|---|---|---|---|---|---|
| K28.0 | — | Reserved | 1C | 001111 0100 | 110000 1011 |
| K28.1 | SOP | Start of Packet | 3C | 001111 1001 | 110000 0110 |
| K28.2 | — | Reserved | 5C | 001111 0101 | 110000 1010 |
| K28.3 | RFLB | Return from Loopback | 7C | 001111 0011 | 110000 1100 |
| K28.4 | — | Reserved | 9C | 001111 0010 | 110000 1101 |
| K28.5 | COM | Comma | BC | 001111 1010 | 110000 0101 |
| K28.6 | SYNC | Synchronization | DC | 001111 0110 | 110000 1001 |
| K28.7 | — | Reserved | FC | 001111 1000 | 110000 0111 |
| K23.7 | — | Reserved | F7 | 111010 1000 | 000101 0111 |
| K27.7 | — | Reserved | FB | 110110 1000 | 001001 0111 |
| K29.7 | EOP | End of packet | FD | 101110 1000 | 010001 0111 |
| K30.7 | — | Reserved | FE | 011110 1000 | 100001 0111 |

FIG. 15

| K code | Symbol | Function | Original data (hexadecimal) | Current RD − | Current RD + |
|---|---|---|---|---|---|
| K28.0 | SDB | Start of DATA Burst | 1C | 001111 0100 | 110000 1011 |
| K28.1 | SOP | Start of Packet | 3C | 001111 1001 | 110000 0110 |
| K28.2 | — | Reserved | 5C | 001111 0101 | 110000 1010 |
| K28.3 | EDB | End of DATA Burst | 7C | 001111 0011 | 110000 1100 |
| K28.4 | — | Reserved | 9C | 001111 0010 | 110000 1101 |
| K28.5 | COM | Comma | BC | 001111 1010 | 110000 0101 |
| K28.6 | — | Reserved | DC | 001111 0110 | 110000 1001 |
| K28.7 | — | Reserved | FC | 001111 1000 | 110000 0111 |
| K23.7 | — | Reserved | F7 | 111010 1000 | 000101 0111 |
| K27.7 | LIDL | Logical Idle | FB | 110110 1000 | 001001 0111 |
| K29.7 | EOP | End of packet | FD | 101110 1000 | 010001 0111 |
| K30.7 | — | Reserved | FE | 011110 1000 | 100001 0111 | ced
COMMUNICATION SYSTEM, COMMUNICATION DEVICE, INTEGRATED CIRCUIT, AND COMMUNICATION METHOD

TECHNICAL FIELD

The present invention relates to technology for transferring data between, for example, a plurality of communication devices connected in a ring via a serial link.

BACKGROUND ART

With recent development in technology for miniaturizing semiconductors and accelerating the speed of the semiconductors, the amount of data communicated between devices or LSIs (Large Scale Integrations) provided in the devices is increasing more than ever. On the other hand, a strict restriction is posed on the number of terminals (pads) in an LSI, which affects the packaging cost. Accordingly, for the purpose of achieving high-speed data communication with a fewer number of terminals in an LSI, the interface standards employing serial communication have widely prevailed.

In general, a bus connection is difficult in a serial line. One example of network topologies used to connect a plurality of communication devices is a ring topology. With the ring topology, a communication device that serves as a relay station connected between a source communication device, from which data is transmitted, and a destination communication device, to which the data is transmitted, needs to be active at any time to perform relay processing. For example, Patent Literature 1 discloses a conventional technique that, in order to reduce the amount of power consumed by such a communication device serving as the relay station, causes the relay station to switch to bypass mode. In this bypass mode, a protocol processing unit that operates in a logical layer, which is unnecessary for the relay processing, is made inactive.

CITATION LIST

Patent Literature

[Patent Literature 1]
  JP Patent Application Publication No. 2005-065216

SUMMARY OF INVENTION

Technical Problem

However, the communication device pertaining to the above-described conventional technique is structured such that, while a reset state of the logical layer is maintained, received data is bypassed at the very last stage of a transmission/reception processing unit that operates in a physical layer. This makes it impossible to reduce the amount of power consumed by the transmission/reception processing unit while performing the bypass processing, an unused line, and a communication device connected to the unused line.

In view of the above, the present invention aims to provide a communication system, a communication device, an integrated circuit and a communication method that enable reduction in the amount of power consumed by an unused line (serial link) and a communication device connected to the unused line.

Solution to Problem

In order to achieve the above aim, a communication system of the present invention includes a first communication device and a plurality of second communication devices, the first communication device and the second communication devices being connected with one another in a ring via a serial link. In the system, the first communication device comprises: a first command processing unit operable to (i) exchange a command packet and a response packet with a partner communication device with which the first communication device performs communication, and (ii) issue a standby packet to the partner communication device when a downlink is not used for data packet transfer, the downlink being a part of the serial link via which the command packet is transferred; and a first data transfer unit operable to (i) transmit a write data packet to be written via the downlink, and (ii) receive a read data packet to be read via an uplink, which is a part of the serial link via which the response packet is transferred. Also in the system, each of the second communication devices comprises: a second command processing unit operable to (i) exchange the command packet and the response packet with a partner communication device with which the own device performs communication, and (ii) issue the standby packet to the partner communication device when the uplink is not used for the data packet transfer; a second data transfer unit operable to receive the write data packet via the downlink and transmit the read data packet via the uplink; a packet relay unit operable to, in accordance with a destination of a packet input to the own device, relay the input packet to one of the first and second communication devices that immediately succeeds the own device in the ring; and a standby control unit operable to, when the input packet relayed by the packet relay unit of the own device is the standby packet, cause the own device to switch to standby mode.

A communication device of the present invention is connected to a serial link and comprises: a command processing unit operable to (i) exchange a command packet and a response packet with a partner communication device with which the own device performs communication, and (ii) issue a standby packet for causing a communication device connected to a part of the serial link that is not used for data packet transfer to switch to standby mode; a data transfer unit operable to transfer (i) a write data packet to be written via a downlink, which is a part of the serial link via which the command packet is transferred, and (ii) a read data packet to be read via an uplink, which is a part of the serial link via which the response packet is transferred; a packet relay unit operable to, in accordance with a destination of a packet input to the own device, relay the input packet to a communication device that immediately succeeds the own device in the ring; and a standby control unit operable to, when the input packet relayed by the packet relay unit is the standby packet, cause the own device to switch to the standby mode.

An integrated circuit of the present invention is used by a communication device included in a plurality of communication devices that are connected with one another in a ring via a serial link and that constitute a communication system. The integrated circuit comprises: a command processing circuit operable to (i) exchange a command packet and a response packet with a partner communication device with which the own device performs communication, and (ii) issue a standby packet for causing a communication device connected to a part of the serial link that is not used for data packet transfer to switch to standby mode; a data transfer circuit operable to transfer (i) a write data packet to be written via a downlink, which is a part of the serial link via which the command packet is transferred, and (ii) a read data packet to be read via an uplink, which is a part of the serial link via which the response packet is transferred; a packet relay circuit operable to, in accordance with a destination of a packet input to the own device, relay the input packet to a communication device that immediately succeeds the own device in the ring; and a standby control unit operable to, when the input packet relayed by the packet relay circuit is the standby packet, cause the own device to switch to the standby mode.

A communication method of the present invention is used in a communication system including a first communication device and a plurality of second communication devices, the first communication device and the second communication devices being connected with one another in a ring via a serial link. The communication method causes the first communication device to perform the steps of: exchanging a command packet and a response packet with a partner communication device with which the first communication device performs communication, and issuing a standby packet to the partner communication device when a downlink is not used for data packet transfer, the downlink being a part of the serial link via which the command packet is transferred; and transmitting a write data packet to be written via the downlink and receiving a read data packet to be read via an uplink, which is a part of the serial link via which the response packet is transferred. The communication method causes each of the second communication devices to perform the steps of: exchanging the command packet and the response packet with a partner communication device with which the own device performs communication, and issuing the standby packet to the partner communication device when the uplink is not used for the data packet transfer; receiving the write data packet via the downlink and transmitting the read data packet via the uplink; in accordance with a destination of a packet input to the own device, relaying the input packet to one of the first and second communication devices that immediately succeeds the own device in the ring; and causing the own device to switch to standby mode when the input packet that has been relayed in the own device is the standby packet.

Advantageous Effects of Invention

According to the above communication system, communication device, integrated circuit and communication method, a communication device connected to a part of the serial link that is not used for data transfer switches to standby mode by relaying a standby packet to an immediately succeeding communication device in the ring. This makes it possible to reduce the amount of power consumed by this unused part of the serial link and by a communication device connected to this unused part of the serial link.

The above communication system may be configured as follows: when the downlink is used for the data packet transfer, the first command processing unit issues a loopback packet to the partner communication device with which the first communication device performs communication; when the uplink is used for the data packet transfer, each of the second command processing units issues the loopback packet to the partner communication device with which the own device performs communication, and when the input packet relayed by the packet relay unit of the own device is the loopback packet, each of the standby control units causes the own device to switch to loopback mode.

According to the above communication system, a communication device connected to a part of the serial link that is used for data transfer switches to loopback mode by relaying a loopback packet to an immediately succeeding communication device in the ring. This makes it possible to reduce the amount of power consumed by a communication device connected to this part of the serial link used for data transfer. As a result of the communication device switching to the loopback mode, the transfer path via which a signal input from the serial link is transferred within the communication device is shortened. This reduces communication latency experienced in the communication device.

The above communication system may be configured as follows: each of the first command processing unit and the second command processing units performs transmission and reception of a flow control packet via the downlink and the uplink; the flow control packet is considered as the standby packet when transmitted via one of the downlink and the uplink that is not used for the data packet transfer; and the flow control packet is considered as the loopback packet when transmitted via one of the downlink and the uplink that is used for the data packet transfer.

According to the above communication system, a flow control packet, which is exchanged to perform flow control, is used to cause a communication device to switch to standby mode or loopback mode. For this reason, there is no need to transmit/receive a special packet for causing a communication device to switch to standby mode or loopback mode. Consequently, an increase in the communication traffic within the serial link can be effectively suppressed.

The above communication system may be configured as follows: the first command processing unit issues a flow control request packet to the partner communication device with which the first communication device performs communication in order to write the write data packet, and in response to the flow control request packet, each of the second command processing units issues a flow control ready packet to the partner communication device with which the own device performs communication; each of the second command processing units issues the flow control request packet to the partner communication device with which the own device performs communication in order for the read data packet to be read, and in response to the flow control request packet, the first command processing unit issues the flow control ready packet to the partner communication device with which the first communication device performs communication; and the flow control request packet is considered as the loopback packet, and the flow control ready packet is considered as the standby packet.

According to the above communication system, a flow control request packet and a flow control ready packet, which are exchanged to perform flow control, are used to cause a communication device to switch to standby mode or loopback mode. For this reason, there is no need to transmit/receive a special packet for causing a communication device to switch to standby mode or loopback mode. Consequently, an increase in the communication traffic within the serial link can be effectively suppressed.

The above communication system may be configured as follows: when the own device is a transmitter of the write data packet or the read data packet, each of the first data transfer unit and the second data transfer units transmits a loopback cancellation signal at an end of transfer of data having a predetermined size, the loopback cancellation signal cancelling the loopback mode of one or more of the first and second communication devices that have switched to the loopback mode; and each of the standby control units cancels the loopback mode of the own device in accordance with detection of the loopback cancellation signal.

According to the above communication system, a serial link for data communication can be used as-is for transmission of a loopback cancellation signal that cancels loopback mode of a communication device. Consequently, there is no need to provide a dedicated line for the loopback cancellation signal, and the cost increase can be effectively suppressed.

The above communication system may be configured as follows: when the own device is a receiver of the write data packet or the read data packet, each of the first command processing unit and the second command processing units transmits a wakeup signal after the transfer of the data having the predetermined size, the wakeup signal cancelling the standby mode of one or more of the first and second communication devices that have switched to the standby mode; each of the first command processing unit and the second command processing units issues a polling packet to which each of the first and second communication devices writes a status of the own device; each of the second communication devices further comprises a wakeup detection unit operable to detect the wakeup signal; and each of the standby control units cancels the standby mode of the own device in accordance with the detection of the wakeup signal, and when the input packet relayed by the packet relay unit of the own device is the polling packet, causes the own device to switch to the standby mode.

According to the above communication system, a serial link for data communication can be used as-is for transmission of a wakeup signal that cancels standby mode of a communication device. Consequently, there is no need to provide a dedicated line for the wakeup signal, and the cost increase can be effectively suppressed. In addition, as the above communication system uses the same polling packet to both (i) notify the status of a communication device and (ii) cause the communication device to switch to standby mode, the amount of power consumed by the communication device can be reduced while preventing an increase in the communication traffic.

The above communication system may be configured as follows: when the own device is a transmitter of the write data packet or the read data packet, each of the first data transfer unit and the second data transfer units transmits a data burst end signal at an end of transfer of data having a predetermined size; and each of the standby control units cancels the loopback mode of the own device in accordance with detection of the data burst end signal.

According to the above communication system, a data bust end signal transmitted at the end of transmission of data having a predetermined size is used to cancel loopback mode of a communication device. Consequently, the loopback mode of the communication device can be cancelled while suppressing an increase in the communication traffic of the serial link.

The above communication system may be configured as follows: when the own device is a receiver of the write data packet or the read data packet, each of the first command processing unit and the second command processing units (i) transmits a wakeup signal after the transfer of the data having the predetermined size, the wakeup signal cancelling the standby mode of one or more of the first and second communication devices that have switched to the standby mode, and (ii) after transmitting the wakeup signal, issues a status packet for notifying a result of the reception of the write data packet or the read data packet; each of the second communication devices further comprises a wakeup detection unit operable to detect the wakeup signal; and each of the standby control units cancels the standby mode of the own device in accordance with the detection of the wakeup signal, and when the input packet relayed by the packet relay unit of the own device is the status packet, causes the own device to switch to the standby mode.

According to the above communication system, a serial link for data communication can be used as-is for transmission of a wakeup signal that cancels standby mode of a communication device. Consequently, there is no need to provide a dedicated line for the wakeup signal, and the cost increase can be effectively suppressed. In addition, as the above communication system uses the same polling packet to both (i) notify the status of a communication device and (ii) cause the communication device to switch to standby mode, the amount of power consumed by the communication device can be reduced while preventing an increase in the communication traffic.

The above communication system may be configured as follows: each of the standby control units causes the own device to switch to the standby mode when the input packet relayed by the packet relay unit of the own device is the command packet or the response packet transferred to a communication device other than the own device.

The above communication system can reduce the amount of power consumed therein.

BRIEF DESCRIPTION OF DRAWINGS

FIG. 4 shows one example of how the special symbols of the 8b/10b scheme, which is used by the communication devices shown in FIG. 1, are allocated to functions.

FIG. 15 shows one example of how the special symbols of the 8b/10b scheme, which is used by communication devices in a communication system pertaining to the first modification example, are allocated to functions.

DESCRIPTION OF EMBODIMENT

[Embodiment]

The following describes an embodiment of the present invention with reference to the drawings.

<System Structure of Communication System>

Figure 1:
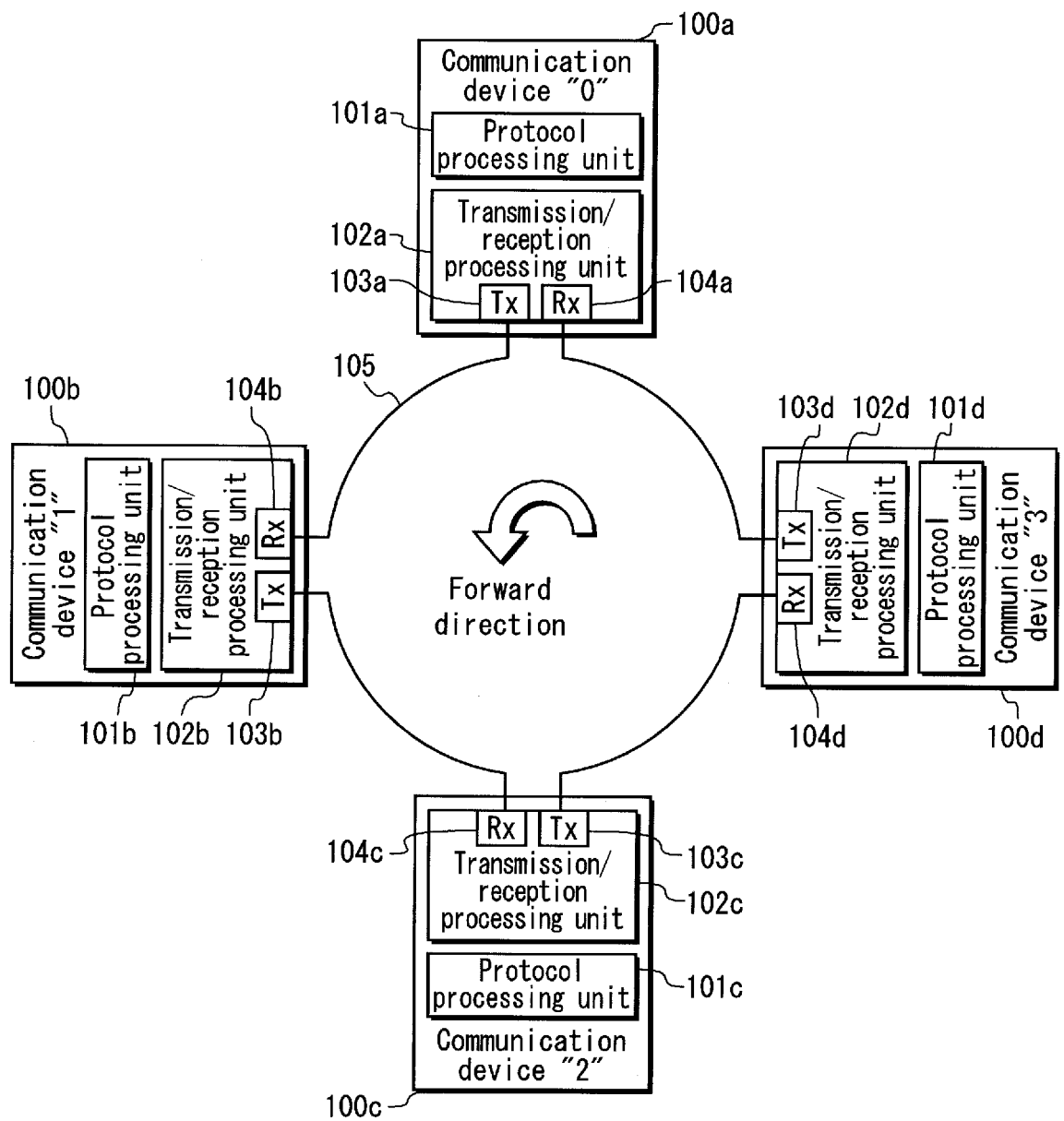
FIG. 1 shows a system structure of a communication system pertaining to an embodiment of the present invention.

FIG. 1 shows a system structure of a communication system pertaining to an embodiment of the present invention.

The communication system shown in FIG. 1 includes four communication devices 100a to 100d. It should be noted here that "0" to "4" shown in FIG. 1 and the like are device IDs assigned to the communication devices 100a to 100d, respectively.

The communication devices 100a to 100d include protocol processing units 101a to 101d and transmission/reception processing units 102a to 102d, respectively. In the present embodiment, the communication device 100a is the master communication device (the first communication device). Accordingly, the communication devices 100b to 100d are non-master communication devices (the second communication devices). The protocol processing units 101a to 101d of the communication devices 100a to 100d are blocks that operate in a logical layer. The transmission/reception processing units 102a to 102d of the communication devices 100a to 100d are blocks that operate in a physical layer, and respectively include serial transmission subunits (Tx) 103a to 103d, serial reception subunits (Rx) 104a to 104d, and the like. With the serial transmission subunits 103a to 103d and the serial reception subunits 104a to 104d in the communication devices 100a to 100d connected sequentially in a ring via a serial link 105, a communication system based on a ring topology is established. Note that in the serial link 105, a serial signal is transmitted in a direction indicated as "Forward direction" in FIG. 1.

Specifics of the protocol processing units 101a to 101d and the transmission/reception processing units 102a to 102d are described later. An overview of these units is described below.

Each of the protocol processing units 101a to 101d interprets a reception packet received from another communication device based on a predetermined protocol, and generates a transmission packet to be output to another communication device. Each of the transmission/reception processing units 102a to 102d receives a serial signal output from a communication device that immediately precedes the own device in the ring via the serial link 105, converts the serial signal into a reception packet, and outputs the reception packet to a corresponding one of the protocol processing units 101a to 101d. Also, each of the transmission/reception processing units 102a to 102d converts a transmission packet input from a corresponding one of the protocol processing units 101a to 101d into a serial signal, and transmits the serial signal to a communication device that immediately succeeds the own device in the ring via the serial link 105.

Each packet exchanged between the communication devices 100a to 100d includes destination information. In a case where the destination information included in a reception packet indicates another communication device different from the own device, each of the protocol processing units 101a to 101d performs relay processing, i.e., outputs the reception packet as a transmission packet to a communication device that immediately succeeds the own device in the ring. As described above, with a communication device between a source communication device and a destination communication device serving as a relay station, a packet exchange between a master communication device and a given slave communication device can be achieved.

<Packet Format of Packet>

The following describes a packet format of a packet exchanged between the communication devices 100a to 100d shown in FIG. 1, with reference to FIGS. 2A to 2D.

Figure 2A:
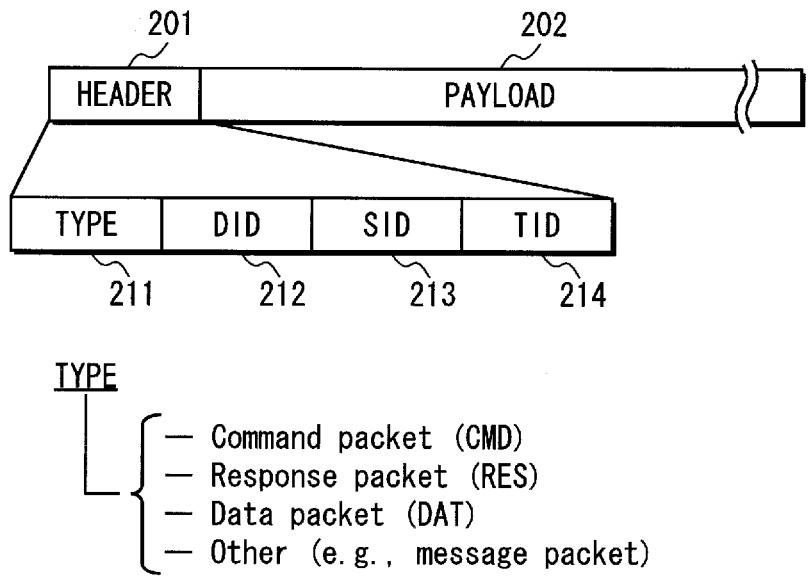
FIG. 2A shows one example of a packet format of a packet.

FIG. 2A shows one example of a packet format of a packet exchanged between the communication devices 100a to 100d shown in FIG. 1. As shown in FIG. 2A, the packet format includes a header (HEADER) 201 and a payload (PAYLOAD) 202.

The header 201 includes a packet type (TYPE) 211, a destination ID (DID) 212 as the aforementioned destination information, a source ID (SID) 213, and a transaction ID (TID) 214.

The packet type 211 shows a type of the packet. Examples of a packet include: a command packet (CMD) issued by a master as a request for starting data transfer; a response packet (RES) issued by a slave, to which the command packet is addressed, as a response to the command packet; a data packet (DAT) including actual data transferred between the master and the slave; and a message packet that is used to notify a status to another communication device via the serial link.

Each of the destination ID 212 and the source ID 213 specifies, for example, one of the device IDs assigned to the communication devices. The total number of communication devices that can be connected in a ring is restricted by the field lengths of the destination ID 212 and the source ID 213. Provided the destination ID 212 and the source ID 213 shown in FIG. 2A each have a field length of four bits, any value in a range of "0" to "15" can be used as a device ID. In the present embodiment, the device ID of the master communication device 100a is "0", and a value "15" is used as a special device ID for performing broadcasting that places all of the communication devices included in the communication system as destination communication devices. Also, in the present embodiment, unique values are assigned as device IDs of the non-master communication devices 100b to 100d at the time of initialization.

In a case where a plurality of commands are issued between a pair of a master and a slave (command queue) and multiple data transfers are performed simultaneously (transactions), the transactions cannot be identified from the destination ID 212 and the source ID 213. The transaction ID 214 is required for this reason.

The payload 202 has different fields depending on the packet type 211. The following describes an overview of payloads of a command packet, a response packet and a data packet.

Figure 2B:
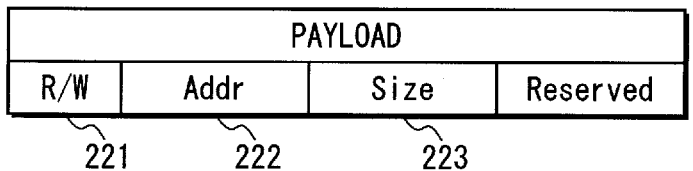
FIG. 2B shows one example of a payload of a command packet.
Figure 2C:
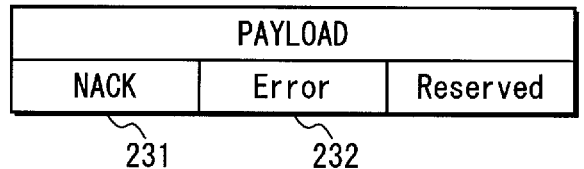
FIG. 2C shows one example of a payload of a response packet.
Figure 2D:
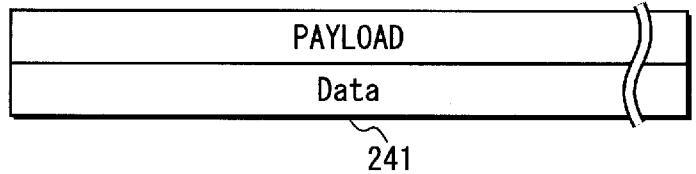
FIG. 2D shows one example of a payload of a data packet. These packets are exchanged between the communication devices shown in FIG. 1.

FIG. 2B shows one example of a payload of a command packet. As shown in FIG. 2B, a payload of a command packet includes the following: an R/W flag 221 indicating a data transfer type, which is one of reading (Read) and writing (Write) of the data transfer; a data transfer start address (Addr) 222; a data transfer size (Size) 223; and the like. FIG. 2C shows one example of a payload of a response packet. As shown in FIG. 2C, a payload of a response packet includes a NACK (Negative Acknowledge) flag 231 indicating whether a command has been received successfully or not, an error code (Error) 232 associated with a command error, and the like. FIG. 2D shows one example of a payload of a data packet. As shown in FIG. 2D, a payload of a data packet includes actual data for data transfer (Data) 241 and the like.

<Payload Formats of Payloads of Other Packets>

Figure 3A:
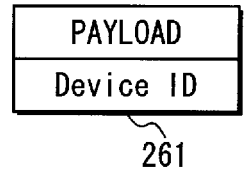
FIG. 3A shows one example of a payload of a device list packet.
Figure 3B:
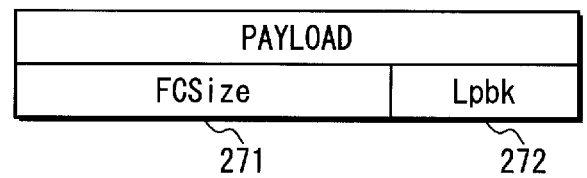
FIG. 3B shows one example of a payload of a flow control packet.
Figure 3C:
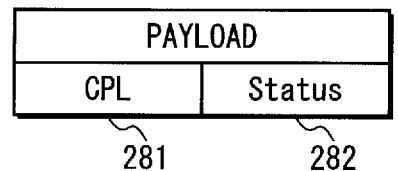
FIG. 3C shows one example of a payload of a polling packet. These packets are exchanged between the communication devices shown in FIG. 1.

With reference to FIGS. 3A to 3C, the following describes payload formats of a device list packet, a flow control packet and a polling packet that are exchanged between the communication devices 100a to 100d shown in FIG. 1.

FIG. 3A shows one example of a payload of a device list packet exchanged between the communication devices 100a to 100d shown in FIG. 1. The device list packet is a packet defined as a message packet by the packet type 211. The device list packet is used by the master communication device to (i) assign a unique device ID to each of the non-master communication devices connected to the serial link, and (ii) obtain the number of such non-master communication devices connected to the serial link. As shown in FIG. 3A, the payload of the device list packet includes a device ID field (Device ID) 261 to which each communication device writes its own device ID.

FIG. 3B shows one example of a payload of a flow control packet exchanged between the communication devices 100a to 100d shown in FIG. 1. The flow control packet is used for performing flow control when a predetermined flow control condition is satisfied. In the present embodiment, the flow control packet is further used as a loopback packet for causing a communication device to switch to loopback mode, or as a standby packet for causing a communication device to switch to standby mode.

As shown in FIG. 3B, the payload of the flow control packet includes a flow control size (FCSize) 271, to which the number of data packets that can be transferred is written, and a loopback flag (Lpbk) 272. Here, data having the data transfer size 223 specified in the command packet is transferred after being divided into a plurality of data packets that each have a predetermined block size. The flow control is performed in units of the flow control size 271 encompassing the plurality of data packets. The loopback flag 272 controls whether or not to cause a communication device between a source communication device that transmits the flow control packet and a destination communication device that receives the flow control packet to switch to loopback mode. The flow control packet is treated as a loopback packet if the loopback flag 272 has been set (flag on), and as a standby packet if the loopback flag 272 has not been set (flag off).

FIG. 3C shows one example of a payload of a polling packet exchanged between the communication devices shown in FIG. 1. The polling packet is used for a status notification, i.e., for indicating whether or not a communication device can perform communication. In the present embodiment, the polling packet is further used as a standby packet that causes a communication device to switch to standby mode. Note that the polling packet is issued after data transfer of the number of data packets specified by the flow control size 271 of the flow control packet.

As shown in FIG. 3C, a payload of a polling packet includes a completion flag (CPL) 281 and a status field (Status) 282. The completion flag 281 is a flag indicating that transfer of data having the data transfer size 223 included in the command packet has been completed. The completion flag 281 is not set in a polling packet issued before completion of transfer of data having the data transfer size 223 included in the command packet (flag off), and is set in a polling packet issued after completion of transfer of such data (flag on). The status field 282 is a field used by a communication device to notify, for example, a status indicating whether or not it can perform communication.

It should be noted that the above-described packet formats may have different structures depending on the scale of the system, protocols, and the like. The packet formats may be modified as necessary by, for example, changing the field lengths, deleting/adding fields, etc.

<Special Symbols of 8b/10b Scheme>

Described below with reference to FIG. 4 are special symbols of the 8b/10b scheme used by the communication devices 100a to 100d shown in FIG. 1. FIG. 4 shows one example of how the special symbols of the 8b/10b scheme, which is used by the communication devices 100a to 100d shown in FIG. 1, are allocated to functions.

By taking advantage of redundancy arising from conversion of 8-bit data into 10-bit data, the 8b/10b scheme can make use of special K symbols for control, in addition to D symbols that express standard 8-bit (byte) data. In the 8b/10b scheme, there are 12 types of K symbols that can be used. In FIG. 4, the "K code", "Symbol", "Function", "Original data (hexadecimal)", "Current RD –", "Current RD +", are illustrated in correspondence. The "Original data (hexadecimal)" denotes 8-bit data before coding based on the 8b/10b scheme. The "Current RD –" and the "Current RD +" each denote 10-bit data after coding based on the 8b/10b scheme. Since a method of converting the pre-coding 8-bit (byte) data into 10-bit data of either "Current RD –" or "Current RD +" is known, the details thereof are omitted.

Referring to FIG. 4, SOP (Start of Packet), EOP (End of Packet), RFLB (Return from Loopback), COM (Comma), SYNC (Synchronization) and EOP (End of Packet) are allocated to some of the functions.

The SOP and EOP indicate, and are appended to, the start and end of a packet, respectively. They are used to acknowledge positions that delimit packets. The RFLB (loopback cancellation code) is used to cancel the loopback mode of a communication device. The SYNC (synchronous code) is used to establish synchronization between the communication devices. The COM is a unique signal pattern that cannot be generated by any combination of two other symbols within the serial data made up of symbol sequences according to the 8b/10b scheme. Hence, the COM is used as a delimiter for correctly acknowledging positions that delimit symbol sequences from the serial data and for converting the serial data into parallel data. It should be noted that special symbols other than the COM may be used not only independently but also as a symbol set combined with the COM which is a delimiter.

<Structure of Communication Devices>

Figure 5:
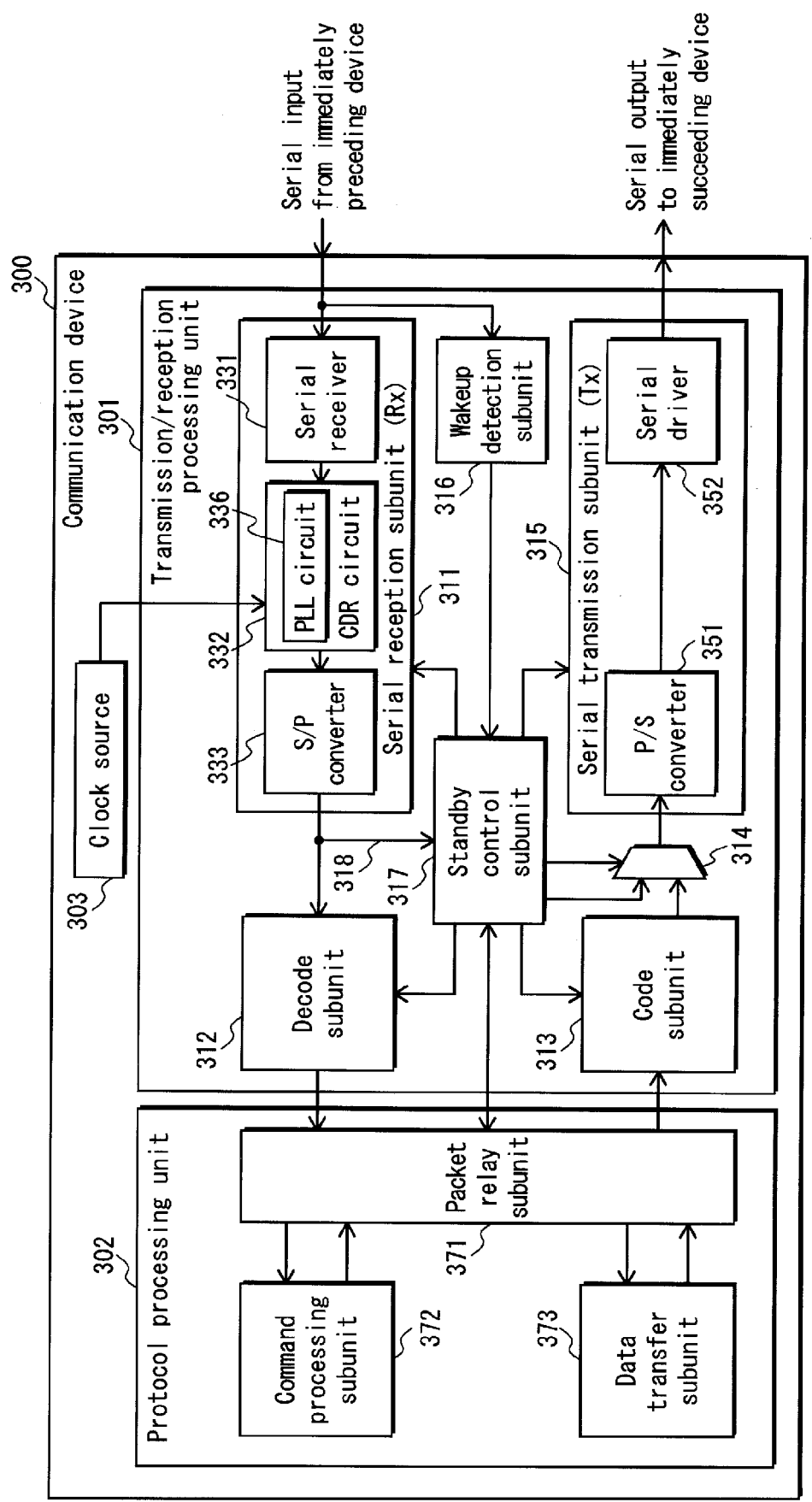
FIG. 5 is a structural diagram of the communication devices shown in FIG. 1.

With reference to FIG. 5, the following describes the structure of the communication devices 100a to 100d shown in FIG. 1. FIG. 5 is a structural diagram of the communication devices 100a to 100d (a communication device 300) shown in FIG. 1.

The communication device 300 is composed of a transmission/reception processing unit 301, a protocol processing unit 302, and a clock source 303. The transmission/reception processing unit 301 is the equivalent of each of the transmission/reception processing units 102a to 102d shown in FIG. 1, and the protocol processing unit 302 is the equivalent of each of the protocol processing units 101a to 101d shown in FIG. 1. The clock source 303 generates a reference clock and is constituted by, for example, a voltage-controlled crystal oscillator (VCXO) and the like.

[Transmission/Reception Processing Unit]

The transmission/reception processing unit 301 includes a serial reception subunit (Rx) 311, a decode subunit 312, a code subunit 313, a loopback selector 314, a serial transmission subunit (Tx) 315, a wakeup detection subunit 316, and a standby control subunit 317. The serial reception subunit 311 is the equivalent of each of the serial reception subunits 104a to 104d shown in FIG. 1. The serial transmission subunit 315 is the equivalent of each of the serial transmission subunits 103a to 103d shown in FIG. 1.

The serial reception subunit 311 includes a serial receiver 331, a clock data recovery (CDR) circuit 332, and a serial-to-parallel converter (S/P converter) 333.

The serial receiver 331 generates serial reception data from a serial signal input from the serial link 105. The CDR circuit 332 generates a data clock and synchronizes the serial reception data based on the reference clock, which is provided by the external clock source 303, and the serial reception data. The S/P converter 333 detects the first bit position of a symbol by detecting a delimiter such as the aforementioned COM symbol from a bit string of the serial reception data from the CDR circuit 332, and converts the serial reception data into parallel reception data having a symbol length conforming to the 8b/10b scheme (a bit width of 10). The parallel reception data output from the S/P converter 333 is input to the decode subunit 312. The parallel reception data is also branched by a loopback path 318, input to the standby control subunit 317, and thereafter input from the standby control subunit 317 to the loopback selector 314. Hereinafter, the parallel reception data branched by the loopback path 318 is referred to as "parallel loopback data".

The following is a further description of the CDR circuit 332. The CDR circuit 332 includes a PLL (Phase-Locked Loop) circuit 336. At the time of initialization, the PLL circuit 336 generates the data clock by multiplying the frequency of the reference clock provided by the clock source 303 so that the reference clock has a desired data clock frequency and by maintaining that desired data clock frequency. In general, jitter (displacement in a time axis direction) is present in serial reception data input from an immediately preceding communication device in the ring. Accordingly, the CDR circuit 332 synchronizes the phase of the data clock with phases of edges of the serial reception data to remove jitter.

Here, in a case where "0" or "1" is consecutively input as the serial reception data, the CDR circuit 332 cannot acknowledge the edges of the serial reception data. To avoid this problem, the code subunit 313 codes bit strings of a transmission packet using the 8b/10b scheme, so that a transition from "0" to "1" or vice versa occurs without fail in a predetermined time period. As a result, generally, only three bits of "0" or "1" are consecutively input (up to five bits). This enables the CDR circuit 332 to acknowledge the edges of the serial reception data and to properly extract information on the edges of the data clock from the serial reception data.

The decode subunit 312 decodes each 10-bit symbol data constituting the parallel reception data into the original 8-bit (byte) data according to a decode table for the 8b/10b scheme, and outputs each 8-bit (byte) data to the protocol processing unit 302 as a reception packet.

The code subunit 313 codes each 8-bit (byte) data constituting the transmission packet input from the protocol processing unit 302 into 10-bit symbol data using the 8b/10b scheme, and outputs the parallel transmission data constituted by each 10-bit symbol data to the loopback selector 314.

Under control of the standby control subunit 317, the loopback selector 314 selectively outputs one of the parallel transmission data and the parallel loopback data to the serial transmission subunit 315.

The serial transmission subunit 315 includes a parallel-to-serial converter (P/S converter) 351 and a serial driver 352. The P/S converter 351 converts the parallel transmission data or the parallel loopback data having a symbol length conforming to the 8b/10b scheme (a bit width of 10) into the serial transmission data or the serial loopback data. The serial driver 352 generates a serial signal from the serial transmission data or the serial loopback data provided by the P/S converter 351, and outputs the serial signal to the serial link 105.

The wakeup detection subunit 316 detects, from the signal state of the serial link 105, that an immediately preceding communication device in the ring switched from an electrically idle state, where it did not drive the serial link (e.g., high impedance), to a state where it drives a wakeup signal. The wakeup signal is used to restore other communication devices to a state where they can transfer packets. Here, it is necessary to transmit a wakeup signal before the data clock is generated during the initialization sequence. Thus, data transitioned using a low-speed reference clock, data fixed as "Low" for a predetermined time period, data fixed as "High" for a predetermined time period, or the like, is used as a wakeup signal.

The standby control subunit 317 performs control for causing each of the serial reception subunit 311, the decode subunit 312, the code subunit 313 and the serial transmission subunit 315 included in the transmission/reception processing unit 301, as well as an entirety of the protocol processing unit 302, to switch between an active state (running state) and a standby state (stopped state). Note, the serial reception subunit 311 and the decode subunit 312 relate to reception processing, and the code subunit 313 and the serial transmission subunit 315 relate to transmission processing.

Also, the standby control subunit 317 causes each communication device to (i) switch to, for example, loopback mode that is used to measure the BER (Bit Error Rate) during a reception test and identify the cause of occurrence of failures, and (ii) cancel the loopback mode. In the present embodiment, the loopback mode is used not only to measure the BER during the reception test and identify the cause of occurrence of failures, but also for the purpose of saving power of each communication device that relays data packets.

[Protocol Processing Unit]

The protocol processing unit 302 includes a packet relay subunit 371, a command processing subunit 372, and a data transfer subunit 373.

Based on the destination ID 212 of the reception packet output from the decode subunit 312, the packet relay subunit 371 makes a judgment on the destination of the reception packet. In a case where the destination ID 212 of the reception packet shows another communication device, the packet relay subunit 371 performs the packet relay processing by outputting the reception packet to the code subunit 313 as a transmission packet. On the other hand, in a case where the destination ID 212 of the reception packet shows the own device, the packet relay subunit 371 outputs the reception packet to one of the command processing subunit 372 and the data transfer subunit 373 depending on the packet type 211 of the reception packet.

The command processing subunit 372 performs various types of processing, such as processing involving exchange of a command packet and a response packet. The following describes the processing involving exchange of a command packet and a response packet. Other processing will be explained later with reference to operational flows and operational sequences.

The command processing subunit 372 of a master issues a command packet to a communication device with which the master is communicating (a slave), waits for reception of a response packet from the slave, and confirms establishment of handshaking upon properly receiving the response packet.

The command processing subunit 372 of the communication device with which the master is communicating (the slave) receives the command packet from the master, and if the data specified by the command packet can be transferred to the master, establishes handshaking by issuing the response packet in which the NACK flag 231 is set to ACK (Acknowledge).

Depending on the result of handshaking whose establishment is determined by the command processing subunit 372, the data transfer subunit 373 either reads (Read) or writes (Write) the data packet.

Note that in the present embodiment, the communication device 300 is said to be in power-saving standby mode when the serial reception subunit 311, the decode subunit 312, the code subunit 313 and the serial transmission subunit 315 included in the transmission/reception processing unit 301, as well as an entirety of the protocol processing unit 302, are in the standby state (stopped state). Also, the communication device 300 is said to be in power-saving loopback mode when the output from the loopback selector 314 is parallel loopback data and the decode subunit 312 and the code subunit 313 included in the transmission/reception processing unit 301, as well as an entirety of the protocol processing unit 302, are in the standby state (stopped state). It goes without saying that blocks to be placed in the standby state during the standby mode and the loopback mode may be modified as necessary in accordance with the structure, etc. of each communication device.

<Connection between Master and Slave>

Figure 6:
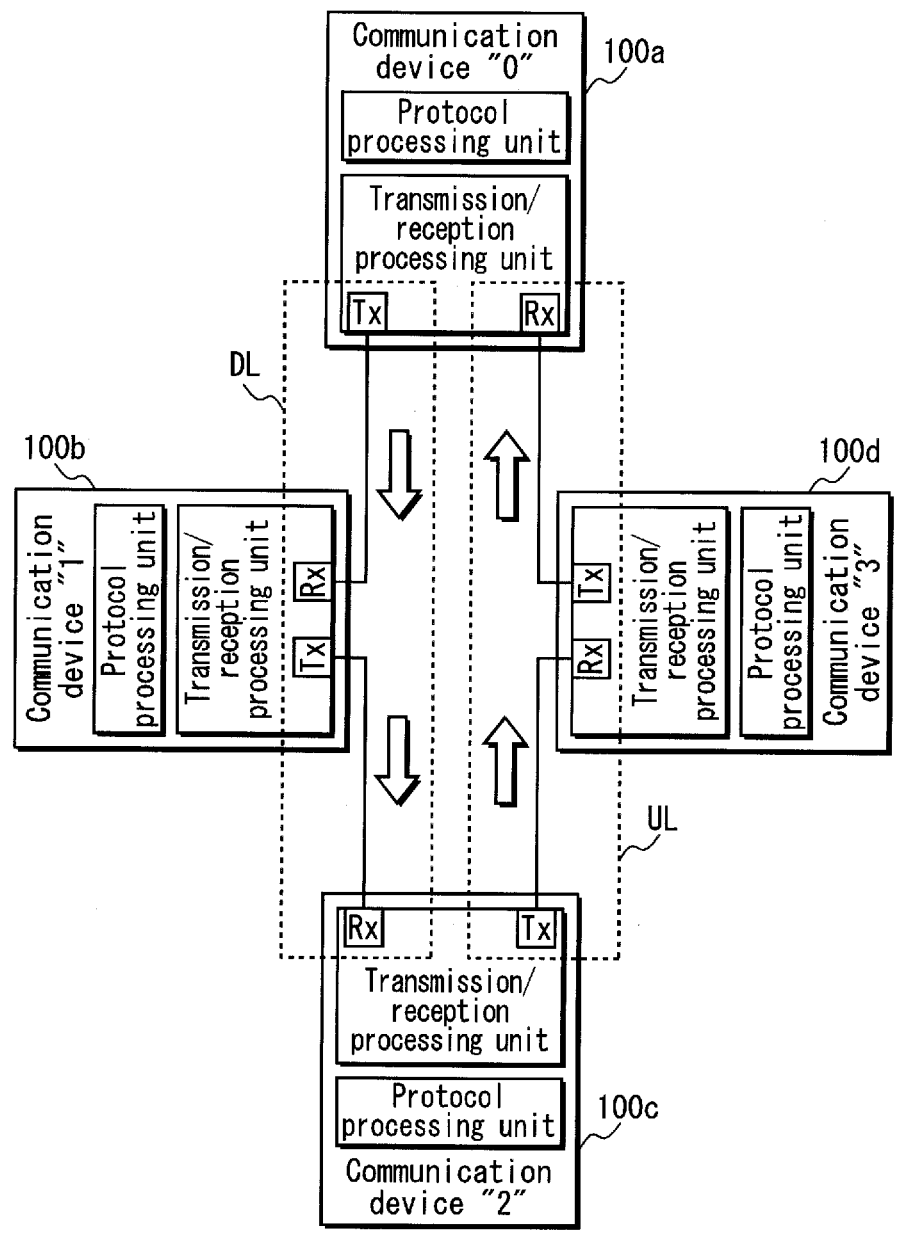
FIG. 6 shows one example of connection between a master and a slave in the communication system shown in FIG. 1.

FIG. 6 shows one example of connection between a master and a slave in the communication system shown in FIG. 1.

When performing data transfer with the communication device 100c serving as a slave, the path from the master communication device 100a via the communication device 100b to the communication device 100c is referred to as a "downlink" DL. Also, the path from the communication device 100c via the communication device 100d to the communication device 100a is referred to as an "uplink" UL.

The command processing subunit 372 of the communication device 100a issues a command packet. The issued command packet is transmitted to the command processing subunit 372 of the communication device 100c via the downlink DL. At this time, the command packet is subjected to relay processing in the packet relay subunit 371 of the communication device 100b. Upon receiving the command packet, the command processing subunit 372 of the communication device 100c issues a response packet. The issued response packet is transmitted to the command processing subunit 372 of the communication device 100a via the uplink UL. At this time, the response packet is subjected to relay processing in the packet relay subunit 371 of the communication device 100d.

In a case where the data transfer type specified by the R/W flag 221 of the command packet indicates data writing, the data transfer subunit 373 of the communication device 100a issues a data packet, which is then transmitted to the communication device 100c via the downlink DL. At this time, the data packet is subjected to relay processing in the communication device 100b. On the other hand, in a case where the data transfer type specified by the R/W flag 221 of the command packet indicates data reading, the data transfer subunit 373 of the communication device 100c issues a data packet, which is then transmitted to the communication device 100a via the uplink UL. At this time, the data packet is subjected to relay processing in the communication device 100d.

As set forth above, with relay stations (in the case of FIG. 6, the communication devices 100b and 100d) between the master and the slave relaying packets, the communication system of the present embodiment can perform data transfer using the same protocol as the protocol used in performing a point-to-point connection.

<Operations of Communication System>

A description is now given of the operations of the communication system shown in FIG. 1.

[Operations of Communication Devices]

Figure 7:
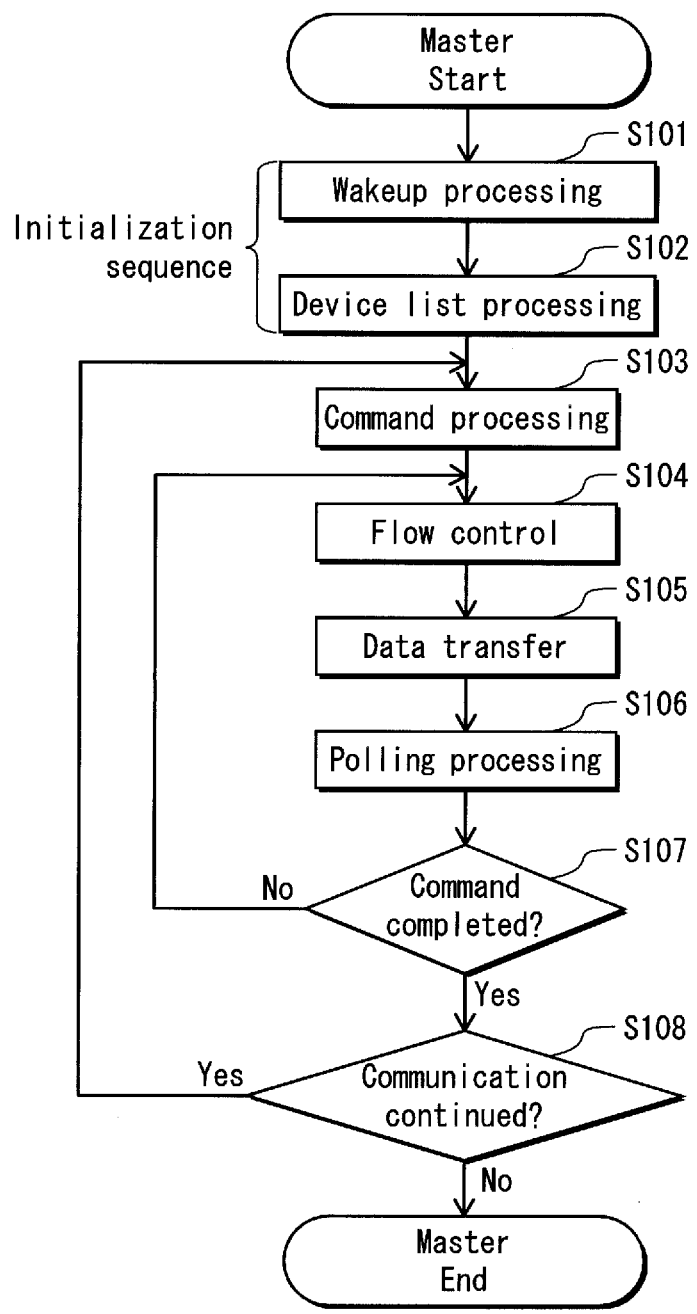
FIG. 7 is a flowchart of the operations performed by the master communication device included in the communication system shown in FIG. 1.
Figure 8:
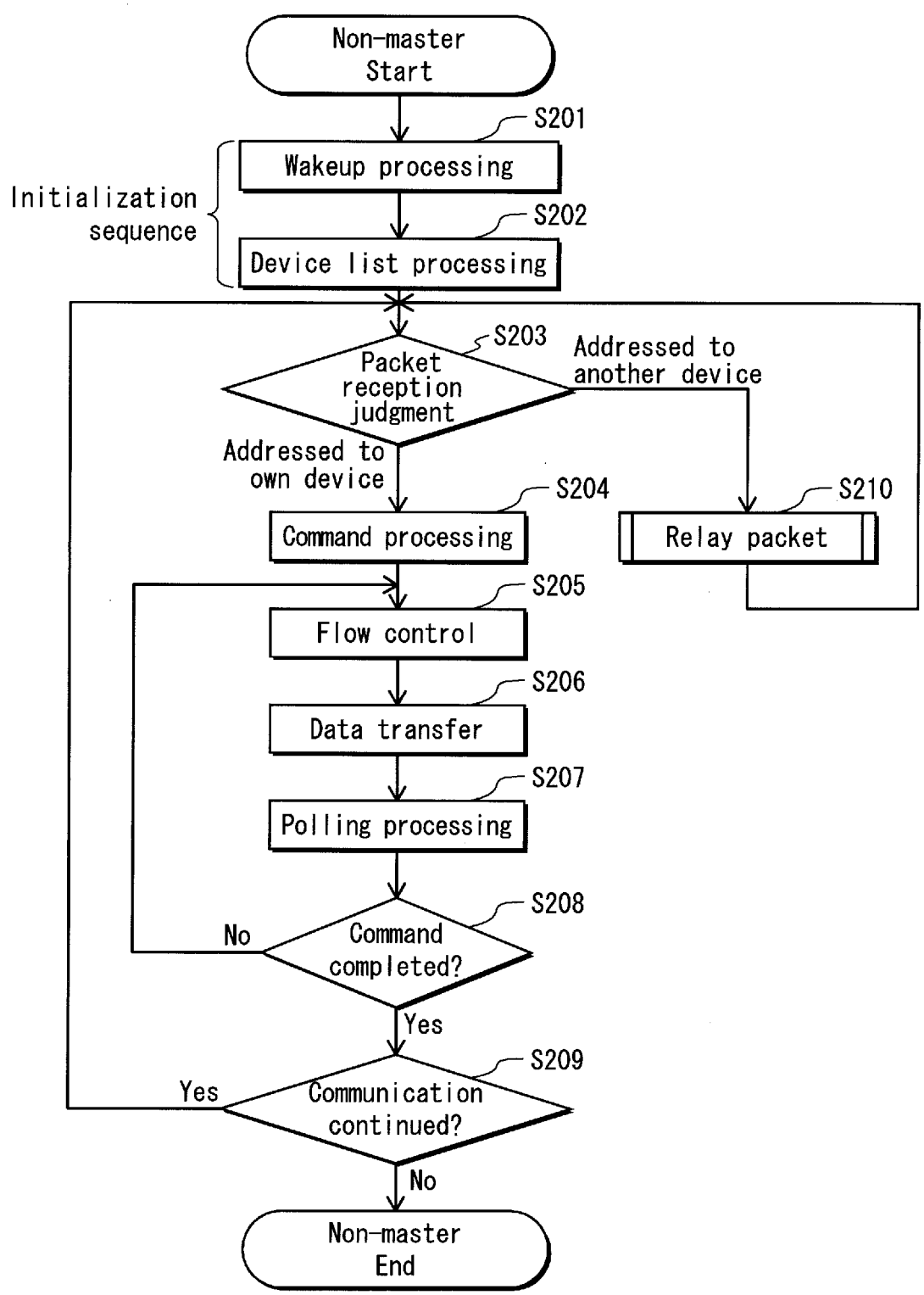
FIG. 8 is a flowchart of the operations performed by the non-master communication devices included in the communication system shown in FIG. 1.

With reference to FIGS. 7 and 8, the following describes the operations of the master communication device 100a and the operations of the non-master communication devices 100b to 100d. Note that FIG. 7 is a flowchart of the operations of the master communication device 100a shown in FIG. 1, and FIG. 8 is a flowchart of the operations of the non-master communication devices 100b to 100d shown in FIG. 1. Below, for the purpose of simplicity, the flowcharts of FIGS. 7 and 8 will be collectively explained where appropriate.

The master communication device 100a performs wakeup processing (step S101). Each of the non-master communication devices 100b to 100d also performs wakeup processing (step S201). It should be noted that the specifics of the wakeup processing performed by each of the communication devices 100a to 100d are omitted here since they will be described later with reference to step S301 in FIG. 10.

After the wakeup processing of steps S101 and S201 is completed, the master communication device 100a performs device list processing (step S102), and each of the non-master communication devices 100b to 100d also performs device list processing (step S202). It should be noted that the specifics of the device list processing performed by each of the communication devices 100a to 100d are omitted here since they will be described later with reference to step S302 in FIG. 10.

After the above initialization sequence (steps S101 and S102) is completed, the master communication device 100a performs command processing, such as issuing of a command (step S103).

After the above initialization sequence (steps S201 and S202) is completed, each of the non-master communication devices 100b to 100d waits for reception of a packet. When each of the communication devices 100b to 100d has received a packet, the packet relay subunit 371 thereof makes a judgment on the destination of the reception packet based on the destination ID 212 of the reception packet (step S203).

When the reception packet is addressed to another communication device (S203: Addressed to another device), each communication device that has received this packet addressed to another communication device performs packet relay processing shown in FIG. 9 (step S210).

On the other hand, when the reception packet is addressed to the own device (S203: Addressed to own device), each communication device that has received this packet addressed to the own device (i.e., the slave communication device) performs the command processing (step S204).

Described below is an overview of the command processing performed by the master communication device 100*a* (step S103) and the command processing performed by the slave communication device (step S204).

The command processing subunit 372 of the master communication device 100*a* issues a command packet for initiating the data transfer, and waits for reception of a response packet from the slave communication device specified by the destination ID212 of the command packet. The command processing subunit 372 of the slave communication device receives the command packet from the master communication device 100*a*, and if the data transfer specified by the command packet can be performed with the communication device 100*a*, establishes handshaking for the command/response by issuing the response packet, in which the NACK flag 231 is set to ACK. The command processing subunit 372 of the communication device 100*a* confirms that the handshaking for the command/response has been established upon properly receiving the response packet from the slave communication device.

After the handshaking for the command/response has been established in the above command processing (steps S103 and S204), the master communication device 100*a* performs flow control (step S104), and the slave communication device also performs flow control (step S205). In the flow control, the master communication device 100*a* and the slave communication device adjust the amount of each data packet to be transferred and the timing of transferring each data packet, while confirming each other's buffer state.

Described below is an overview of the flow control performed by the master communication device 100*a* (step S104) and the flow control performed by the slave communication device (step S205).

The command processing subunit 372 of the master communication device 100*a* and the command processing subunit 372 of the slave communication device each transmit/receive a wakeup signal, and thereafter transmit/receive synchronous code.

Then, the command processing subunit 372 of the master communication device 100*a* issues a flow control packet in which (i) the device ID of the slave communication device is set as the destination ID 212 and (ii) the flow control size 271 contains the number of data packets that can be transferred. The command processing subunit 372 of the slave communication device receives the flow control packet from the master communication device 100*a*, and when the data transfer indicated by the flow control size 271 of the flow control packet becomes possible, issues a flow control packet in which the device ID of the master communication device 100*a* is set as the destination ID 212. The command processing subunit 372 of the master communication device 100*a* receives the flow control packet from the slave communication device, and confirms that handshaking for the flow control has been established upon properly receiving the flow control packet.

At this time, the data transfer is performed by using one of the downlink and the uplink. Each of the command processing subunit 372 of the master communication device 100*a* and the command processing subunit 372 of the slave communication device sets a loopback flag 272 in a flow control packet transferred via a partial link (one of the downlink and the uplink) that is used for the data transfer (flag on), and does not set a loopback flag 272 in a flow control packet transferred via a partial link (one of the downlink and the uplink) that is not used for the data transfer via (flag off).

That is to say, when the data transfer type specified by the R/W flag 221 indicates data writing, the command processing subunit 372 of the master communication device 100*a* sets the loopback flag 272 in a flow control packet, whereas the command processing subunit 372 of the slave communication device does not set the loopback flag 272 in a flow control packet. On the other hand, when the data transfer type indicates data reading, the command processing subunit 372 of the slave communication device sets the loopback flag 272 in a flow control packet, whereas the command processing subunit 372 of the master communication device 100*a* does not set the loopback flag 272 in a flow control packet.

After the handshaking for the flow control has been established in the above flow control (steps S104 and S205), the data transfer subunit 373 of the master communication device 100*a* performs data transfer (step S105), and the data transfer subunit 373 of the slave communication device also performs data transfer (step S206). At the end of the data transfer, the data transfer subunit 373 of the communication device that issues the data packet issues loopback cancellation code (RFLB).

In the data communication between the master communication device 100*a* and the slave communication device, when the data transfer type indicates data writing, the data transfer subunit 373 of the master communication device 100*a* issues a data packet. This data packet is transmitted as a serial signal via the downlink, and the data transfer subunit 373 of the slave communication device receives this data packet. At this time, the uplink and each communication device connected to the uplink are unused, i.e., not used for the transfer of the data packet.

On the other hand, when the data transfer type indicates data reading, the data transfer subunit 373 of the slave communication device issues a data packet. This data packet is transmitted as a serial signal via the uplink. Then, the data transfer subunit 373 of the master communication device 100*a* receives the data packet. At this time, the downlink and each communication device connected to the downlink are unused, i.e., not used for the transfer of the data packet.

After completion of data transfer of the number of data packets specified by the flow control size 271 of the flow control packet (steps S105 and S206), the master communication device 100*a* performs polling processing (step S106), and the slave communication device also performs polling processing (step S207).

The following describes an overview of the polling processing performed by the master communication device 100*a* (step S106) and the polling processing performed by the slave communication device (step S207). The following also describes processing performed with respect to a polling packet by each communication device that serves as a relay station.

The command processing subunit 372 of the master communication device 100*a* issues a polling packet in which the device ID of the slave communication device is set as the destination ID 212. Note that the command processing subunit 372 of the master communication device 100*a* does not set the completion flag 281 before completion of transfer of data having the data transfer size 223 of the command packet (flag off), and sets the completion flag 281 upon completion of transfer of such data (flag on).

The packet relay subunit 371 of each communication device serving as a relay station (i) judges that the polling packet is addressed to another communication device, (ii)

additionally writes, to the status field 282 of the polling packet, a status indicating, for example, whether or not the own device can perform communication, and (iii) outputs the polling packet to an immediately succeeding communication device in the ring.

The packet relay subunit 371 of the slave communication device judges that the polling packet is addressed to the own device, and outputs the polling packet to the command processing subunit 372.

The command processing subunit 372 of the slave communication device issues a polling packet in which (i) the device ID of the master communication device 100a is set as the destination ID 212 and (ii) the content of the status field 282 of the input polling packet, as well as a status indicating, for example, whether or not the own device can perform communication, are written to the status field 282. Note that the command processing subunit 372 of the slave communication device does not set the completion flag 281 before completion of transfer of data having the data transfer size 223 of the command packet (flag off), and sets the completion flag 281 upon completion of transfer of such data (flag on).

The packet relay subunit 371 of each communication device serving as a relay station (i) judges that the polling packet is addressed to another communication device, (ii) additionally writes, to the status field 282 of the polling packet, a status indicating, for example, whether or not the own device can perform communication, and (iii) outputs the polling packet to an immediately succeeding communication device in the ring.

The packet relay subunit 371 of the master communication device 100a judges that the polling packet is addressed to the own device, and outputs the polling packet to the command processing subunit 372. Then, the command processing subunit 372 obtains, from the status field 282 of the input polling packet, the statuses of all of the communication devices that are connected to the serial link 105, excluding the own device.

Note that the command processing subunit 372 of the master communication device 100a uses the obtained statuses of all of the communication devices, excluding the own device, to select a slave to which the own device issues the next command.

Until the transfer of the data having the data transfer size 223 of the command packet is completed (S107: No), the master communication device 100a repeats the processing of steps S104 through S106. Once the transfer of the data having the data transfer size 223 of the command packet has been completed (S107: Yes), the processing moves to step S108. If the communication is to be continued with issuance of a command packet (S108: Yes), then the master communication device 100a performs the processing of step S103 onward, thus continuing the communication. If the communication is not to be continued (S108: No), then the master communication device 100a completes the communication.

Until the transfer of the data having the data transfer size 223 of the command packet is completed (S208: No), the slave communication device repeats the processing of steps S205 through S207. Once the transfer of the data having the data transfer size 223 of the command packet has been completed (S208: Yes), the processing moves to step S209. If the communication is to be continued with reception of a command packet (S209: Yes), then the slave communication device performs the processing of step S203 onward, thus continuing the communication. If the communication is not to be continued (S209: No), then the slave communication device completes the communication.

(Packet Relay Processing)

Figure 9:
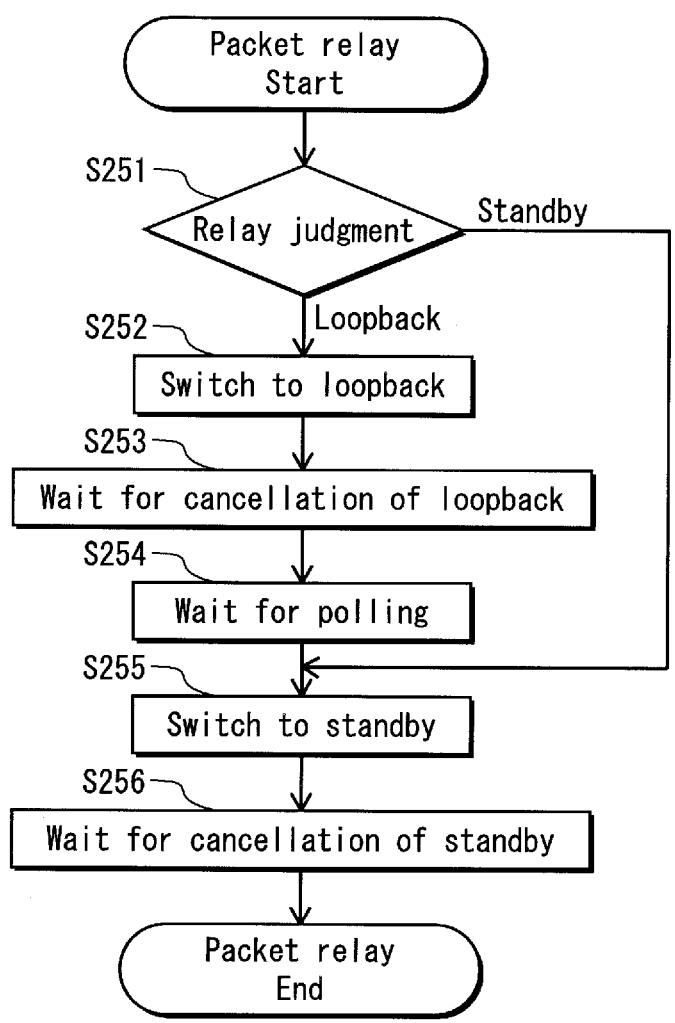
FIG. 9 is a flowchart of the operations for the packet relay processing shown in FIG. 8.

FIG. 9 is a flowchart of the operations for the packet relay processing (step S210) shown in FIG. 8.

The packet relay subunit 371 of each communication device that has received a packet addressed to another communication device judges whether the reception packet is a standby packet or a loopback packet (step S251).

The standby packet is a packet with an attribute that causes another communication device to switch to standby mode. After the protocol processing unit 302 has received the standby packet, the standby control subunit 317 causes the serial reception subunit 311 and the decode subunit 312 of the transmission/reception processing unit 301, which relate to reception processing, to switch to a standby state. After the standby packet is transmitted, the standby control subunit 317 causes the code subunit 313 and the serial transmission subunit 315, which relate to transmission processing, to a standby state. Therefore, when the protocol processing unit 302 performs relay processing on the standby packet, any circuit relating to the above-described transmission/reception is placed in a standby state, and since the transmission/reception is stopped, an entirety of the communication device, including the protocol processing unit 302, is placed in standby mode. In the present embodiment, all the packets that are issued to another communication device after completion of the initialization sequence, excluding a flow control packet that is issued to another communication device and that has the loopback flag 272 set therein and a data packet, are considered as standby packets.

A loopback packet is a packet with an attribute that causes each communication device connected to a partial link (one of the uplink and the downlink) that is used for data transfer to switch to loopback mode. After the protocol processing unit 302 has performed relay processing on the loopback packet, the standby control subunit 317 causes the loopback selector 314 to switch to loopback mode where it outputs parallel loopback data to the serial transmission subunit 315. In the present embodiment, a flow control packet that is addressed to another communication device and that has the loopback flag 272 set therein is considered as a loopback packet.

When the reception packet is a standby packet (S251: Standby), the packet relay subunit 371 of each communication device relays the reception packet as a transmission packet to an immediately succeeding communication device in the ring. In each communication device that has relayed the standby packet, the standby control subunit 317 causes the own device to switch to the power-saving standby mode by placing the serial reception subunit 311, the decode subunit 312, the code subunit 313 and the serial transmission subunit 315 included in the transmission/reception processing unit 301, as well as an entirety of the protocol processing unit 302, in a standby state (step S255). After switching to the standby mode, each communication device waits for detection of a wakeup signal. When the wakeup detection unit 316 has detected the wakeup signal, the standby control subunit 317 cancels the standby mode of the own device by placing the serial reception subunit 311, the decode subunit 312, the code subunit 313 and the serial transmission subunit 315 included in the transmission/reception processing unit 301, as well as an entirety of the protocol processing unit 302, in an active state (step S256).

When the reception packet is a loopback packet (S251: Loopback), the packet relay subunit 371 of each communication device relays the reception packet as a transmission packet to an immediately succeeding communication device in the ring. In each communication device that has relayed the loopback packet, the standby control subunit 317 causes the own device to switch to the power-saving loopback mode by (i) switching the output from the loopback selector 314 from parallel transmission data to parallel loopback data, and (ii) placing the decode subunit 312 and the code subunit 313 included in the transmission/reception processing unit 301, as well as an entirety of the protocol processing unit 302, in a standby state (step S252). Note that after switching to the loopback mode, each communication device transfers the input from the serial link 105 to the serial reception subunit 311, the standby control subunit 317, the loopback selector 314 and the serial transmission subunit 315, in this order, and thereafter outputs the input to the serial link 105, until the loopback mode is cancelled.

After switching to the loopback mode, each communication device waits for cancellation of the loopback mode. When detecting the loopback cancellation code (RFLB) from the parallel loopback data, the standby control subunit 317 switches the output from the loopback selector 314 from the parallel loopback data to parallel transmission data, and cancels the loopback mode of the own device by placing the decode subunit 312 and the code subunit 313 included in the transmission/reception processing unit 301, as well as an entirety of the protocol processing unit 302, in an active state (step S253).

After the loopback mode has been cancelled, the packet relay subunit 371 of each communication device waits for reception of a polling packet. The packet relay subunit 371 additionally writes, to the status field 282 of the polling packet, a status indicating whether or not the own device can perform communication, and relays the polling packet, to which the status of the own device has been additionally written, to an immediately succeeding communication device in the ring (step S254). In each communication device that has relayed the polling packet, the standby control subunit 317 causes the own device to switch to standby mode by placing the serial reception subunit 311, the decode subunit 312, the code subunit 313 and the serial transmission subunit 315 included in the transmission/reception processing unit 301, as well as an entirety of the protocol processing unit 302, in a standby state (step S255). After switching to the standby mode, each communication device waits for detection of a wakeup signal. When the wakeup detection unit 316 has detected the wakeup signal, the standby control subunit 317 cancels the standby mode of the own device by placing the serial reception subunit 311, the decode subunit 312, the code subunit 313 and the serial transmission subunit 315 included in the transmission/reception processing unit 301, as well as an entirety of the protocol processing unit 302, in an active state (step S256).

[Operational Sequences for Entirety of Communication System]

(Initialization Sequence and Operational Sequence Relating to Command Processing)

Figure 10:
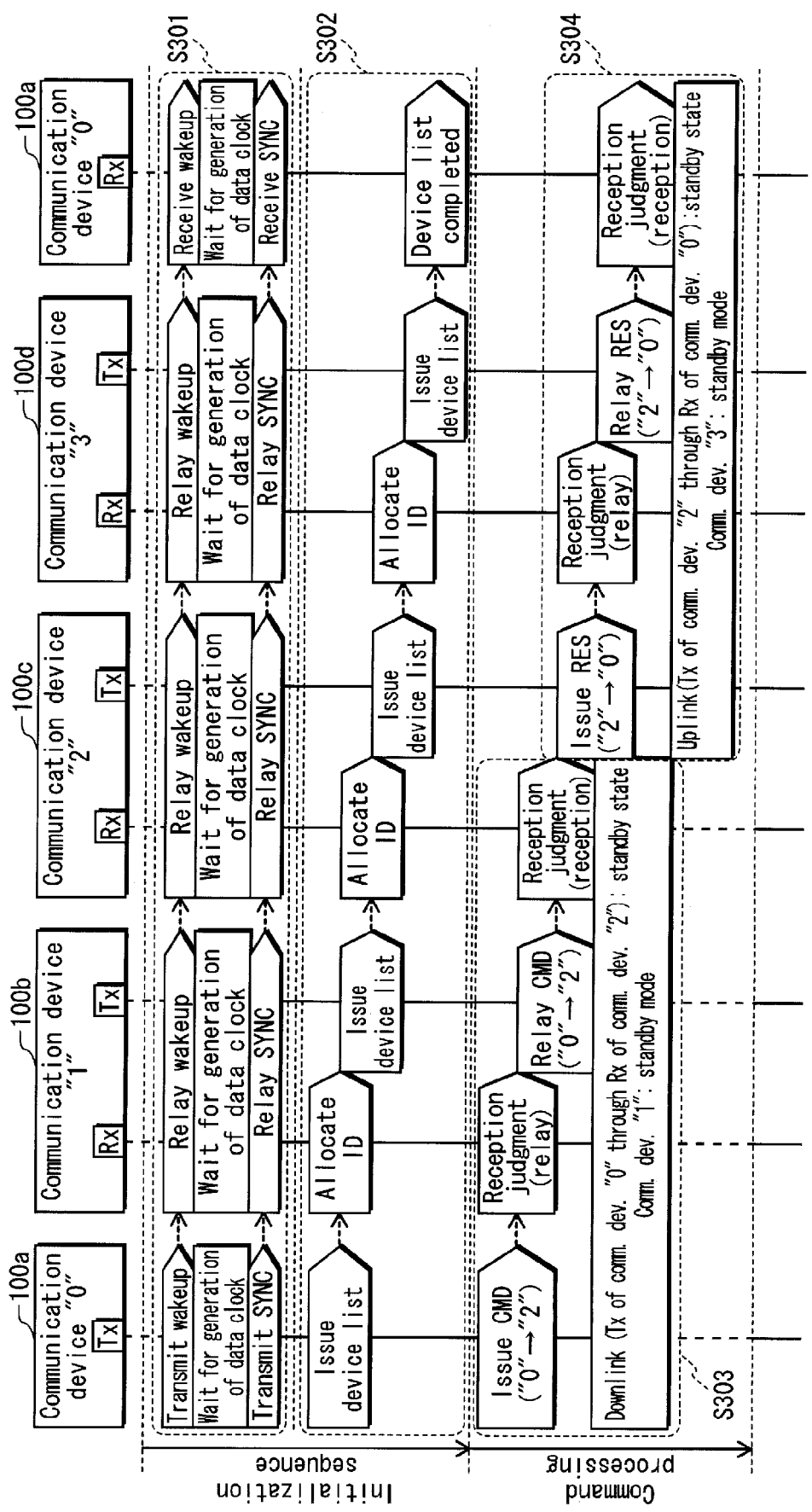
FIG. 10 shows an initialization sequence and an operational sequence relating to command processing for an entirety of the communication system shown in FIG. 1.

FIG. 10 shows the initialization sequence and an operational sequence relating to command processing for an entirety of the communication system shown in FIG. 1.

In the communication device 100a, the command processing subunit 372 starts transmission of a wakeup signal from the serial driver 352 via the serial link 105, which is in an electrically idle state that occurs immediately after the power is turned on, and the PLL circuit 336 starts generating a data clock. Each of the communication devices 100b to 100d is in a state where it is waiting for the wakeup signal. In the communication devices 100b to 100d, the wakeup detection subunits 316 detect the wakeup signal from the signal state of the serial link 105 in order, the serial drivers 352 output the wakeup signal to the serial link 105 thereby relaying the wakeup signal, and the PLL circuits 336 start generating a data clock. In the communication device 100a, the wakeup detection subunit 316 detects the looped wakeup signal from the signal state of the serial link 105.

In the communication device 100a, when the PLL circuit 336 completes the generation of the data clock as a predetermined time period elapses, the command processing subunit 372 starts issuing the synchronous code (SYNC). After the generation of the data clock is completed, each of the packet relay subunits 371 of the communication devices 100b to 100d relays the synchronous code to an immediately succeeding communication device in the ring, in order. The command processing subunit 372 of the communication device 100a receives the synchronous code that has been looped via the serial link 105.

This concludes the description of processing performed in step S301 by the master communication device 100a and the non-master communication devices 100b to 100d of the communication system.

The command processing subunit 372 of the communication device 100a issues a device list packet in which (i) the device ID "15" for broadcasting is set as the destination ID 212 and (ii) the device ID "0" of the own device is included in the device ID field 261.

Each of the packet relay subunits 371 of the communication devices 100b to 100d receives the device list packet in order, and considers that a value obtained by incrementing the value of the device ID field 261 included in the payload 202 of the device list packet by "1" as the device ID of the own device. Then, each of the packet relay subunits 371 writes the device ID of the own device to the device ID field 261, and relays the device list packet to which the device ID of the own device has been written to an immediately succeeding communication device in the ring.

Once the device IDs have been respectively allocated to all of the communication devices in the above manner, the device list packet arrives at the communication device 100a. Based on the value "3" of the device ID field 261 included in the payload 202 of the device list packet, the command processing subunit 372 of the communication device 100a acknowledges that other than the own device, three communication devices 100b to 100d are connected to the serial link 105.

This concludes the description of processing performed in step S302 by the master communication device 100a and the non-master communication devices 100b to 100d of the communication system.

The command processing subunit 372 of the communication device 100a issues a command packet (CMD) to the communication device 100c. This command packet is input to the code subunit 313 via the packet relay subunit 371, and a serial signal corresponding to the command packet is output from the serial transmission subunit 315 to the serial link 105.

In the communication device 100a, the command processing subunit 372, which has issued the command packet that serves as a standby packet, outputs a control signal to the standby control subunit 317 via the packet relay subunit 371, the control signal being for causing the transmitting side of the transmission/reception processing unit 301 (the code subunit 313 and the serial transmission subunit 315) to switch to a standby state. In response to the control signal, after the serial signal corresponding to the command packet is output from the serial transmission subunit 315 to the serial link 105, the standby control subunit 317 places the code subunit 313 and the serial transmission subunit 315 in the standby state.

In the communication device 100b, the serial signal corresponding to the command packet is input to the serial reception subunit 311, and the command packet is input to the packet relay subunit 371. The packet relay subunit 371 makes a judgment on the destination of the command packet, judges that the command packet is addressed to another communication device, and outputs the command packet to the code subunit 313. The serial signal corresponding to this command packet is output from the serial transmission subunit 315 to the serial link 105.

In the communication device 100*b*, the packet relay subunit 371 judges the command packet, which is addressed to another communication device, as a standby packet, and outputs to the standby control subunit 317 a control signal for causing the communication device 100*b* to switch to standby mode. In response to this control signal, after the serial signal corresponding to the command packet is output from the serial transmission subunit 315 to the serial link 105, the standby control subunit 317 causes the own communication device 100*b* to switch to the standby mode.

In the communication device 100*c*, the serial signal corresponding to the command packet is input to the serial reception subunit 311, and the command packet is input to the packet relay subunit 371. The packet relay subunit 371 makes a judgment on the destination of the command packet, judges that the command packet is addressed to the own device, and outputs the command packet to the command processing subunit 372.

In the communication device 100*c*, the packet relay subunit 371, which has received the command packet that serves as a standby packet, outputs to the standby control subunit 317 a control signal for causing the receiving side of the transmission/reception processing unit 301 (the serial reception subunit 311 and the decode subunit 312) to switch to a standby state. In response to this control signal, the standby control subunit 317 places the serial reception subunit 311 and the decode subunit 312 of the transmission/reception processing unit 301 in the standby state.

Through the above sequence of operations, the downlink is placed in a standby state and the communication device 100*b* connected to the downlink is placed in standby mode.

This concludes the description of processing performed in step S303 by the master communication device 100*a* and the non-master communication devices 100*b* to 100*d* of the communication system.

In response to the command packet, the command processing subunit 372 of the destination communication device (slave communication device) 100*c*, to which the command packet is addressed, issues a response packet (RES) addressed to the communication device 100*a*. This response packet is input to the code subunit 313 via the packet relay subunit 371, and a serial signal corresponding to the response packet is output from the serial transmission subunit 315 to the serial link 105.

In the communication device 100*c*, the command processing subunit 372, which has issued the response packet that serves as a standby packet, outputs a control signal to the standby control subunit 317 via the packet relay subunit 371, the control signal being for causing the transmitting side of the transmission/reception processing unit 301 to switch to a standby state. In response to the control signal, after the serial signal corresponding to the response packet is output to the serial link 105, the standby control subunit 317 places the code subunit 313 and the serial transmission subunit 315 in the standby state.

In the communication device 100*d*, the serial signal corresponding to the response packet is input to the serial reception subunit 311, and the response packet is input to the packet relay subunit 371. The packet relay subunit 371 makes a judgment on the destination of the response packet, judges that the response packet is addressed to another communication device, and outputs the response packet to the code subunit 313. The serial signal corresponding to this response packet is output from the serial transmission subunit 315 to the serial link 105.

In the communication device 100*d*, the packet relay subunit 371 judges the response packet, which is addressed to another communication device, as a standby packet, and outputs to the standby control subunit 317 a control signal for causing the own communication device 100*d* to switch to standby mode. In response to this control signal, after the serial signal corresponding to the response packet is output from the serial transmission subunit 315 to the serial link 105, the standby control subunit 317 causes the own communication device 100*d* to switch to the standby mode.

In the communication device 100*a*, the serial signal corresponding to the response packet is input to the serial reception subunit 311, and the response packet is input to the packet relay subunit 371. The packet relay subunit 371 makes a judgment on the destination of the response packet, judges that the response packet is addressed to the own device, and outputs the response packet to the command processing subunit 372. With this response packet, the command processing subunit 372 confirms that handshaking for the command/response has been established.

In the communication device 100*a*, the packet relay subunit 371, which has received the response packet that serves as a standby packet, outputs to the standby control subunit 317 a control signal for causing the receiving side of the transmission/reception processing unit 301 to switch to a standby state. In response to this control signal, the standby control subunit 317 places the serial reception subunit 311 and the decode subunit 312 in the standby state.

Through the above sequence of operations, the uplink is placed in a standby state and the communication device 100*d* connected to the uplink is placed in standby mode.

This concludes the description of processing performed in step S304 by the master communication device 100*a* and the non-master communication devices 100*b* to 100*d* of the communication system.

(Operational Sequences Relating to Flow Control, Data Transfer and Polling in Case of Data Writing)

Figure 11:
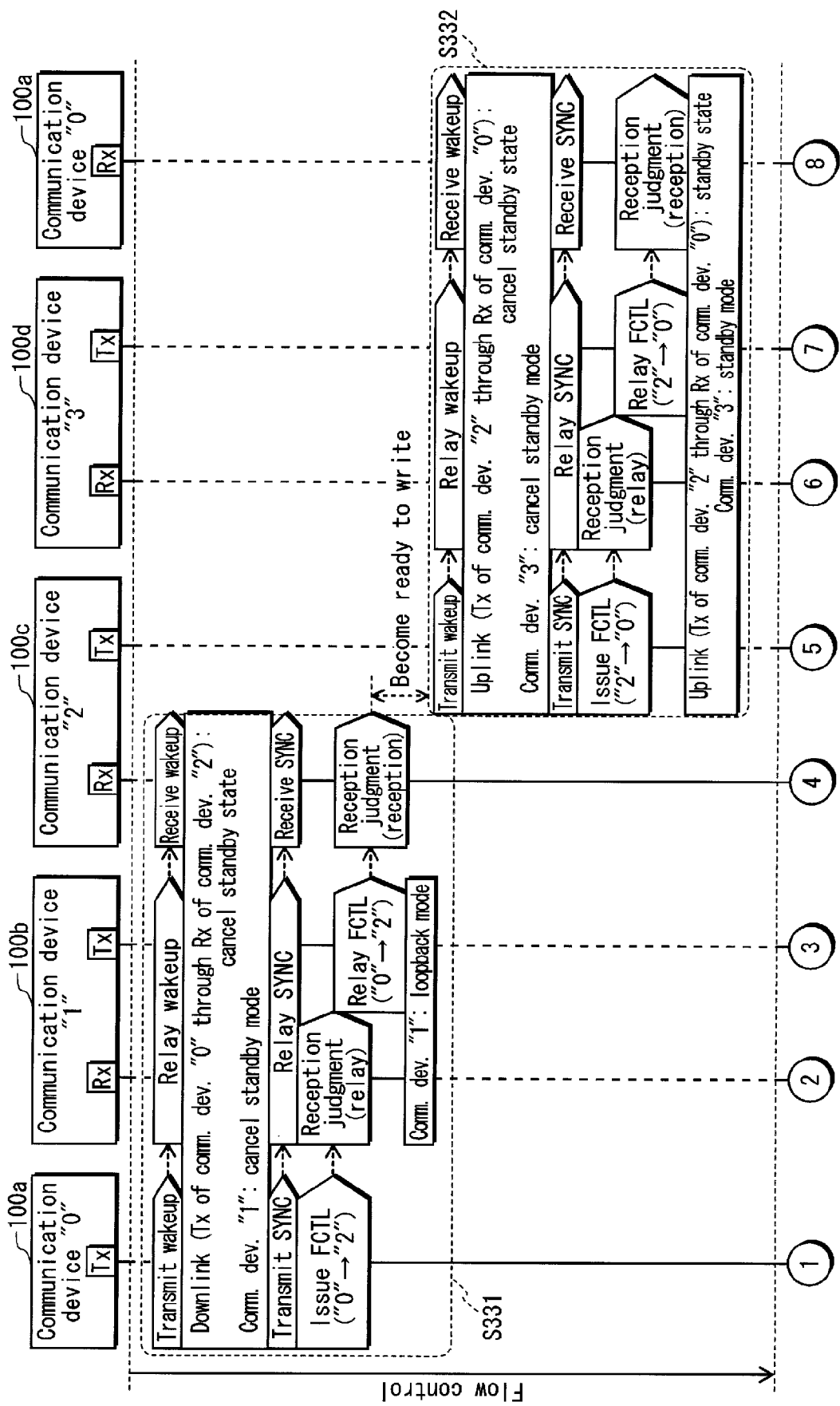
FIG. 11 shows an operational sequence for an entirety of the communication system shown in FIG. 1, the operational sequence relating to flow control, data transfer and polling and being performed upon data writing.
Figure 12:
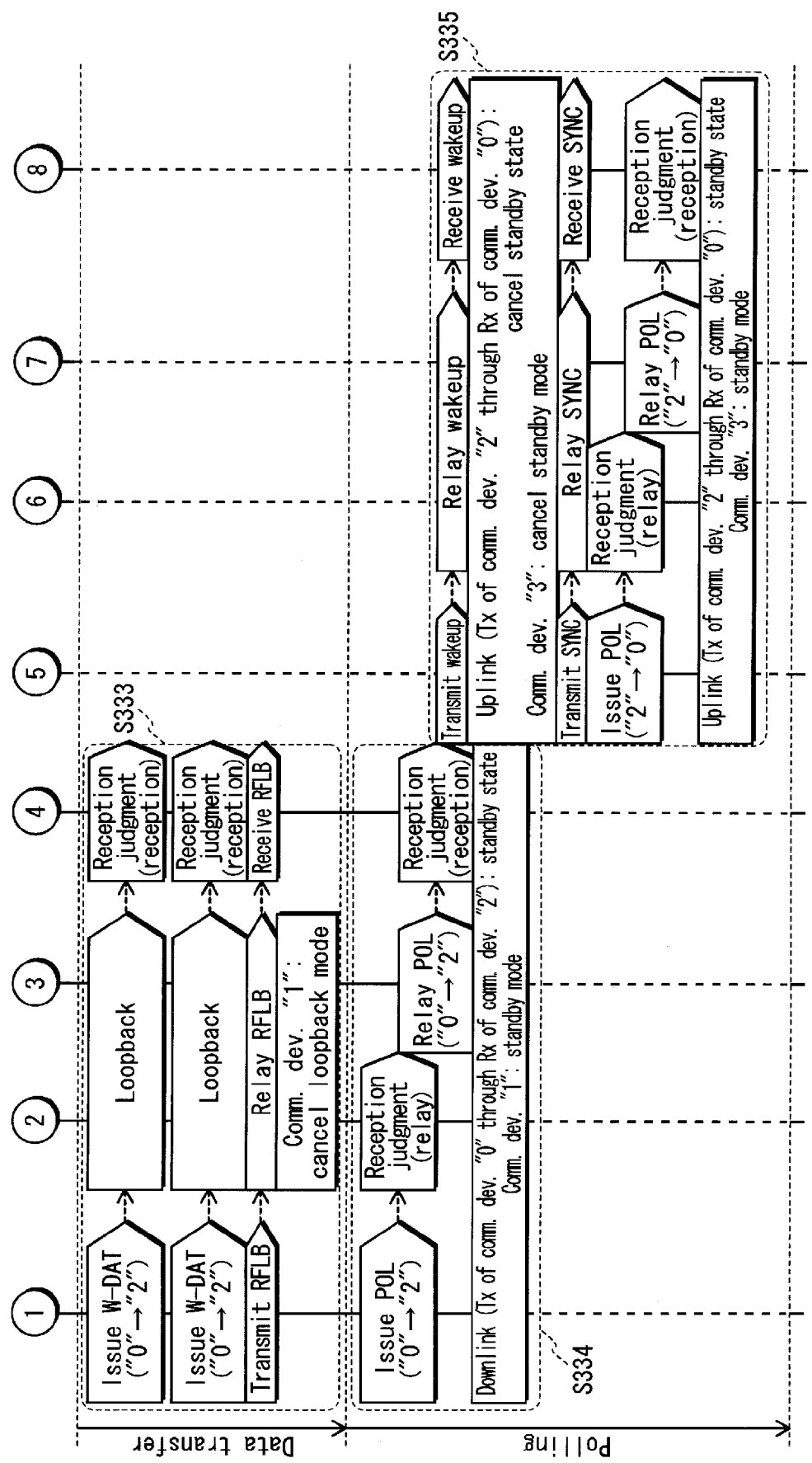
FIG. 12 shows an operational sequence for an entirety of the communication system shown in FIG. 1, the operational sequence relating to flow control, data transfer and polling and being performed upon data writing.

The operational sequences shown in FIGS. 11 and 12 relate to flow control, data transfer and polling, and follow the command processing shown in FIG. 10 in a case where the R/W flag 221 of the command packet indicates data writing.

The command processing subunit 372 of the communication device 100*a* outputs a control signal for cancelling the standby state of the transmitting side of the transmission/reception processing unit 301 to the standby control subunit 317 via the packet relay subunit 371. In response to this control signal, the standby control subunit 317 places the code subunit 313 and the serial transmission subunit 315 in an active state. Then, the command processing subunit 372 of the communication device 100*a* causes the serial transmission subunit 315 to output a wakeup signal to the serial link 105 so that the wakeup signal will be transmitted to the communication device 100*c*.

In the communication device 100*b*, the wakeup detection subunit 316 detects the wakeup signal, and outputs to the standby control subunit 317 a control signal for cancelling the standby mode of the own communication device 100*b*. In response to this control signal, the standby control subunit 317 cancels the standby mode of the own communication device 100*b*. Then, the communication device 100*b* relays the wakeup signal to an immediately succeeding communication device in the ring by causing the serial transmission subunit 315 to output the wakeup signal to the serial link 105.

In the communication device 100c, the wakeup detection subunit 316 detects the wakeup signal and outputs to the standby control subunit 317 a control signal for cancelling the standby state of the serial reception subunit 311 and the decode subunit 312. In response to this control signal, the standby control subunit 317 places the serial reception subunit 311 and the decode subunit 312 in an active state.

Through the above sequence of operations, the standby state of the downlink is cancelled, and the standby mode of the communication device 100b connected to the downlink is cancelled.

Next, the command processing subunit 372 of the communication device 100a issues a predetermined number of synchronous codes (SYNCs), and thereafter issues a flow control packet (FCTL) which is addressed to the communication device 100c and in which the loopback flag 272 is set. This flow control packet is input to the code subunit 313 via the packet relay subunit 371, and a serial signal corresponding to the flow control packet is output from the serial transmission subunit 315 to the serial link 105.

In the communication device 100b, the S/P converter 333 of the serial reception subunit 311 properly acknowledges positions that delimit symbols from the serial reception data corresponding to the synchronous codes, and converts the serial reception data into parallel data. As a result, succeeding serial reception data is received as a flow control packet and input to the packet relay subunit 371. The packet relay subunit 371 makes a judgment on the destination of the flow control packet, judges that the flow control packet is addressed to another communication device, and after performing the relay output of the received synchronous codes, outputs the flow control packet to the code subunit 313. The serial signal corresponding to this flow control packet is output from the serial transmission subunit 315 to the serial link 105.

In the communication device 100b, the packet relay subunit 371 judges the flow control packet, which is addressed to another communication device and in which the loopback flag 272 is set, as a loopback packet, and outputs to the standby control subunit 317 a control signal for causing the own communication device 100b to switch to loopback mode. In response to this control signal, after the serial signal corresponding to the flow control packet is output from the serial transmission subunit 315 to the serial link 105, the standby control subunit 317 causes the own communication device 100b to switch to the loopback mode.

Similarly, in the communication device 100c also, the flow control packet, which has been properly converted to parallel data as a result of the S/P converter 333 of the serial reception subunit 311 receiving the synchronous codes, is input to the packet relay subunit 371. The packet relay subunit 371 makes a judgment on the destination of the flow control packet, judges that the flow control packet is addressed to the own device, and outputs the flow control packet to the command processing subunit 372.

This concludes the description of processing performed in step S331 by the master communication device 100a and the non-master communication devices 100b and 100c of the communication system.

In the communication device 100c, the command processing subunit 372 outputs a control signal to the standby control subunit 317 via the packet relay subunit 371, the control signal being for cancelling the standby state of the transmitting side of the transmission/reception processing unit 301. In response to this control signal, the standby control subunit 317 places the code subunit 313 and the serial transmission subunit 315 in an active state. Then, the command processing subunit 372 of the communication device 100c causes the serial transmission subunit 315 to output a wakeup signal to the serial link 105 so that the wakeup signal will be transmitted to the communication device 100a.

In the communication device 100d, the wakeup detection subunit 316 detects the wakeup signal, and outputs to the standby control subunit 317 a control signal for cancelling the standby mode of the own communication device 100d. In response to this control signal, the standby control subunit 317 cancels the standby mode of the own communication device 100d. Then, the communication device 100d relays the wakeup signal to an immediately succeeding communication device in the ring by causing the serial transmission subunit 315 to output the wakeup signal to the serial link 105.

In the communication device 100a, the wakeup detection subunit 316 detects the wakeup signal and outputs to the standby control subunit 317 a control signal for cancelling the standby state of the serial reception subunit 311 and the decode subunit 312. In response to this control signal, the standby control subunit 317 places the serial reception subunit 311 and the decode subunit 312 in an active state.

Through the above sequence of operations, the standby state of the uplink is cancelled, and the standby mode of the communication device 100d connected to the uplink is cancelled.

Next, the command processing subunit 372 of the communication device 100c issues a predetermined number of synchronous codes (SYNCs), and thereafter issues a flow control packet (FCTL) which is addressed to the communication device 100a and in which the loopback flag 272 is not set. This flow control packet is input to the code subunit 313 via the packet relay subunit 371, and a serial signal corresponding to the flow control packet is output from the serial transmission subunit 315 to the serial link 105.

In the communication device 100c, the command processing subunit 372 that has issued the flow control packet, which serves as a standby packet and in which the loopback flag 272 is not set, outputs a control signal to the standby control subunit 317 via the packet relay subunit 371, the control signal being for causing the transmitting side of the transmission/reception processing unit 301 to switch to a standby state. In response to this control signal, after the serial signal corresponding to the flow control packet is output from the serial transmission subunit 315 to the serial link 105, the standby control subunit 317 places the code subunit 313 and the serial transmission subunit 315 in the standby state.

In the communication device 100d, the S/P converter 333 of the serial reception subunit 311 properly acknowledges positions that delimit symbols from the serial reception data corresponding to the synchronous codes, and converts the serial reception data into parallel data. As a result, succeeding serial reception data is received as a flow control packet and input to the packet relay subunit 371. The packet relay subunit 371 makes a judgment on the destination of the flow control packet, judges that the flow control packet is addressed to another communication device, and after performing the relay output of the received synchronous codes, outputs the flow control packet to the code subunit 313. The serial signal corresponding to this flow control packet is output from the serial transmission subunit 315 to the serial link 105.

In the communication device 100d, the packet relay subunit 371 judges the flow control packet, which is addressed to another communication device and in which the loopback flag 272 is not set, as a standby packet, and outputs to the standby control subunit 317 a control signal for causing the own communication device 100d to switch to standby mode. In response to this control signal, after the serial signal corresponding to the flow control packet is output from the serial transmission subunit 315 to the serial link 105, the standby control subunit 317 causes the own communication device 100d to switch to the standby mode.

Similarly, in the communication device 100a also, the flow control packet, which has been properly converted to parallel data as a result of the S/P converter 333 of the serial reception subunit 311 receiving the synchronous codes, is input to the packet relay subunit 371. The packet relay subunit 371 makes a judgment on the destination of the flow control packet, judges that the flow control packet is addressed to the own device, and outputs the flow control packet to the command processing subunit 372. With this flow control packet, the command processing subunit 372 confirms that handshaking for the flow control has been established.

In the communication device 100a, the packet relay subunit 371 that has received the flow control packet, which serves as a standby packet and in which the loopback flag 272 is not set, outputs to the standby control subunit 317 a control signal for causing the receiving side of the transmission/reception processing unit 301 to switch to a standby state. In response to this control signal, the standby control subunit 317 places the serial reception subunit 311 and the decode subunit 312 in the standby state.

Through the above sequence of operations, the uplink is placed in a standby state and the communication device 100d connected to the uplink is placed in standby mode.

This concludes the description of processing performed in step S332 by the master communication device 100a and the non-master communication devices 100c and 100d of the communication system.

The data transfer subunit 373 of the communication device 100a issues a data packet (W-DAT) to the communication device 100c. This data packet is input to the code subunit 313 via the packet relay subunit 371, and a serial signal corresponding to the data packet is output from the serial transmission subunit 315 to the serial link 105.

In the communication device 100b, an input signal corresponding to the data packet from the serial link 105 arrives at the serial reception subunit 311, the standby control subunit 317, the loopback selector 314 and the serial transmission subunit 315, in this order, and then is output to the serial link 105.

In the communication device 100c, the serial signal corresponding to the data packet is input to the serial reception subunit 311, and the data packet is input to the packet relay subunit 371. The packet relay subunit 371 makes a judgment on the destination of the data packet, judges that the data packet is addressed to the own device, and outputs the data packet to the data transfer subunit 373.

The above sequence of processing is repeatedly performed until the writing of the number of data packets specified by the flow control packet is completed.

Once the writing of the number of data packets specified by the flow control packet has been completed, the data transfer subunit 373 of the communication device 100a issues loopback cancellation code (RFLB). This loopback cancellation code is input to the code subunit 313 via the packet relay subunit 371, and a serial signal corresponding to the loopback cancellation code is output from the serial transmission subunit 315 to the serial link 105.

In the communication device 100b, the input signal corresponding to the loopback cancellation code from the serial link 105 arrives at the serial reception subunit 311, the standby control subunit 317, the loopback selector 314 and the serial transmission subunit 315, in this order, and then is output to the serial link 105. At this time, the standby control subunit 317 detects the loopback cancellation code, and after the input signal corresponding to the loopback cancellation code is output to the serial link 105, cancels the loopback mode of the own communication device 100b.

In the communication device 100c, the serial signal corresponding to the loopback cancellation code is input to the serial reception subunit 311, and the loopback cancellation code is input to the packet relay subunit 371. The packet relay subunit 371 outputs the loopback cancellation code to the data transfer subunit 373. Upon receiving the loopback cancellation code, the data transfer subunit 373 completes reception of data packets specified by the flow control size.

This concludes the description of processing performed in step S333 by the master communication device 100a and the non-master communication devices 100b and 100c of the communication system.

After the completion of data transfer such as issuance of the number of data packets specified by the flow control size 271 of the flow control packet, the command processing subunit 372 of the communication device 100a issues a polling packet (POL) to the communication device 100c. This polling packet is input to the code subunit 313 via the packet relay subunit 371, and a serial signal corresponding to the polling packet is output from the serial transmission subunit 315 to the serial link 105.

In the communication device 100a, the command processing subunit 372, which has issued the polling packet that serves as a standby packet, outputs a control signal to the standby control subunit 317 via the packet relay subunit 371, the control signal being for causing the transmitting side of the transmission/reception processing unit 301 to switch to a standby state. In response to this control signal, after the serial signal corresponding to the polling packet is output from the serial transmission subunit 315 to the serial link 105, the standby control subunit 317 places the code subunit 313 and the serial transmission subunit 315 in the standby state.

In the communication device 100b, the serial signal corresponding to the polling packet is input to the serial reception subunit 311, and the polling packet is input to the packet relay subunit 371. The packet relay subunit 371 makes a judgment on the destination of the polling packet, judges that the polling packet is addressed to another communication device, additionally writes a status of the own communication device 100b to the status field 282 of the polling packet, and outputs to the code subunit 313 the polling packet to which the status of the own communication device 100b has been additionally written. The serial signal corresponding to this polling packet is output from the serial transmission subunit 315 to the serial link 105.

In the communication device 100b, the packet relay subunit 371 judges that the polling packet, which is addressed to another communication device, as a standby packet, and outputs to the standby control subunit 317 a control signal for causing the communication device 100b to switch to standby mode. In response to this control signal, after the serial signal corresponding to the polling packet is output from the serial transmission subunit 315 to the serial link 105, the standby control subunit 317 causes the own communication device 100b to switch to the standby mode.

In the communication device 100c, the serial signal corresponding to the polling packet is input to the serial reception subunit 311, and the polling packet is input to the packet relay subunit 371. The packet relay subunit 371 makes a judgment on the destination of the polling packet, judges that the polling packet is addressed to the own device, and outputs the polling packet to the command processing subunit 372.

In the communication device 100c, the packet relay subunit 371, which has received the polling packet that serves as a standby packet, outputs to the standby control subunit 317 a control signal for causing the receiving side of the transmission/reception processing unit 301 to switch to a standby state. In response to this control signal, the standby control subunit 317 places the serial reception subunit 311 and the decode subunit 312 in the standby state.

Through the above sequence of operations, the downlink is placed in a standby state and the communication device 100b connected to the downlink is placed in standby mode.

This concludes the description of processing performed in step S334 by the master communication device 100a and the non-master communication devices 100b and 100c of the communication system.

In the communication device 100c, the command processing subunit 372 outputs a control signal to the standby control subunit 317 via the packet relay subunit 371, the control signal being for cancelling the standby state of the transmitting side of the transmission/reception processing unit 301. In response to this control signal, the standby control subunit 317 places the code subunit 313 and the serial transmission subunit 315 in an active state. Then, the command processing subunit 372 of the communication device 100b causes the serial transmission subunit 315 to output a wakeup signal to the serial link 105 so that the wakeup signal will be transmitted to the communication device 100a.

In the communication device 100d, the wakeup detection subunit 316 detects the wakeup signal, and outputs to the standby control subunit 317 a control signal for cancelling the standby mode of the own communication device 100d. In response to this control signal, the standby control subunit 317 cancels the standby mode of the own communication device 100d. Then, the communication device 100d relays the wakeup signal to an immediately succeeding communication device in the ring by causing the serial transmission subunit 315 to output the wakeup signal to the serial link 105.

In the communication device 100a, the wakeup detection subunit 316 detects the wakeup signal and outputs to the standby control subunit 317 a control signal for cancelling the standby state of the serial reception subunit 311 and the decode subunit 312. In response to this control signal, the standby control subunit 317 places the serial reception subunit 311 and the decode subunit 312 in an active state.

Through the above sequence of operations, the standby state of the uplink is cancelled, and the standby mode of the communication device 100d connected to the uplink is cancelled.

Next, after issuing a predetermined number of synchronous codes (SYNC), the command processing subunit 372 of the communication device 100c issues to the communication device 100a a polling packet (POL), in which the content of the status field 282 of the polling packet input in step S334, as well as a status indicating, for example, whether the own communication device 100c can perform communication, are written to the status field 282. This polling packet is input to the code subunit 313 via the packet relay subunit 371, and a serial signal corresponding to the polling packet is output from the serial transmission subunit 315 to the serial link 105.

In the communication device 100c, the command processing subunit 372, which has issued the polling packet that serves as a standby packet, outputs a control signal to the standby control subunit 317 via the packet relay subunit 371, the control signal being for causing the transmitting side of the transmission/reception processing unit 301 to switch to a standby state. In response to this control signal, after the serial signal corresponding to the polling packet is output from the serial transmission subunit 315 to the serial link 105, the standby control subunit 317 places the code subunit 313 and the serial transmission subunit 315 in the standby state.

In the communication device 100d, the S/P converter 333 of the serial reception subunit 311 properly acknowledges positions that delimit symbols from the serial reception data corresponding to the synchronous codes, and converts the serial reception data into parallel data. As a result, succeeding serial reception data is properly received as a polling packet and input to the packet relay subunit 371. The packet relay subunit 371 (i) makes a judgment on the destination of the polling packet, (ii) judges that the polling packet is addressed to another communication device, (iii) after performing the relay output of the received synchronous codes, additionally writes a status indicating, for example, whether or not the own device can perform communication to the status field 282 of the polling packet, and (iv) outputs to the code subunit 313 the polling packet to which the status of the own communication device 100d has been additionally written. The serial signal corresponding to this polling packet is output from the serial transmission subunit 315 to the serial link 105.

In the communication device 100d, the packet relay subunit 371 judges the polling packet, which is addressed to another communication device, as a standby packet, and outputs to the standby control subunit 317 a control signal for causing the communication device 100d to switch to standby mode. In response to this control signal, after the serial signal corresponding to the polling packet is output from the serial transmission subunit 315 to the serial link 105, the standby control subunit 317 causes the own communication device 100d to switch to the standby mode.

Similarly, in the communication device 100a also, the polling packet, which has been properly converted to parallel data as a result of the S/P converter 333 of the serial reception subunit 311 receiving the synchronous codes, is input to the packet relay subunit 371. The packet relay subunit 371 makes a judgment on the destination of the polling packet, judges that the polling packet is addressed to the own device, and outputs the polling packet to the command processing subunit 372.

In the communication device 100a, the packet relay subunit 371, which has received the polling packet that serves as a standby packet, outputs to the standby control subunit 317 a control signal for causing the receiving side of the transmission/reception processing unit 301 to switch to a standby state. In response to this control signal, the standby control subunit 317 places the serial reception subunit 311 and the decode subunit 312 in the standby state.

Through the above sequence of operations, the uplink is placed in a standby state and the communication device 100d connected to the uplink is placed in standby mode.

This concludes the description of processing performed in step S335 by the master communication device 100a and the non-master communication devices 100c and 100d of the communication system.

(Operational Sequences Relating to Flow Control, Data Transfer and Polling in Case of Data Reading)

Figure 13:
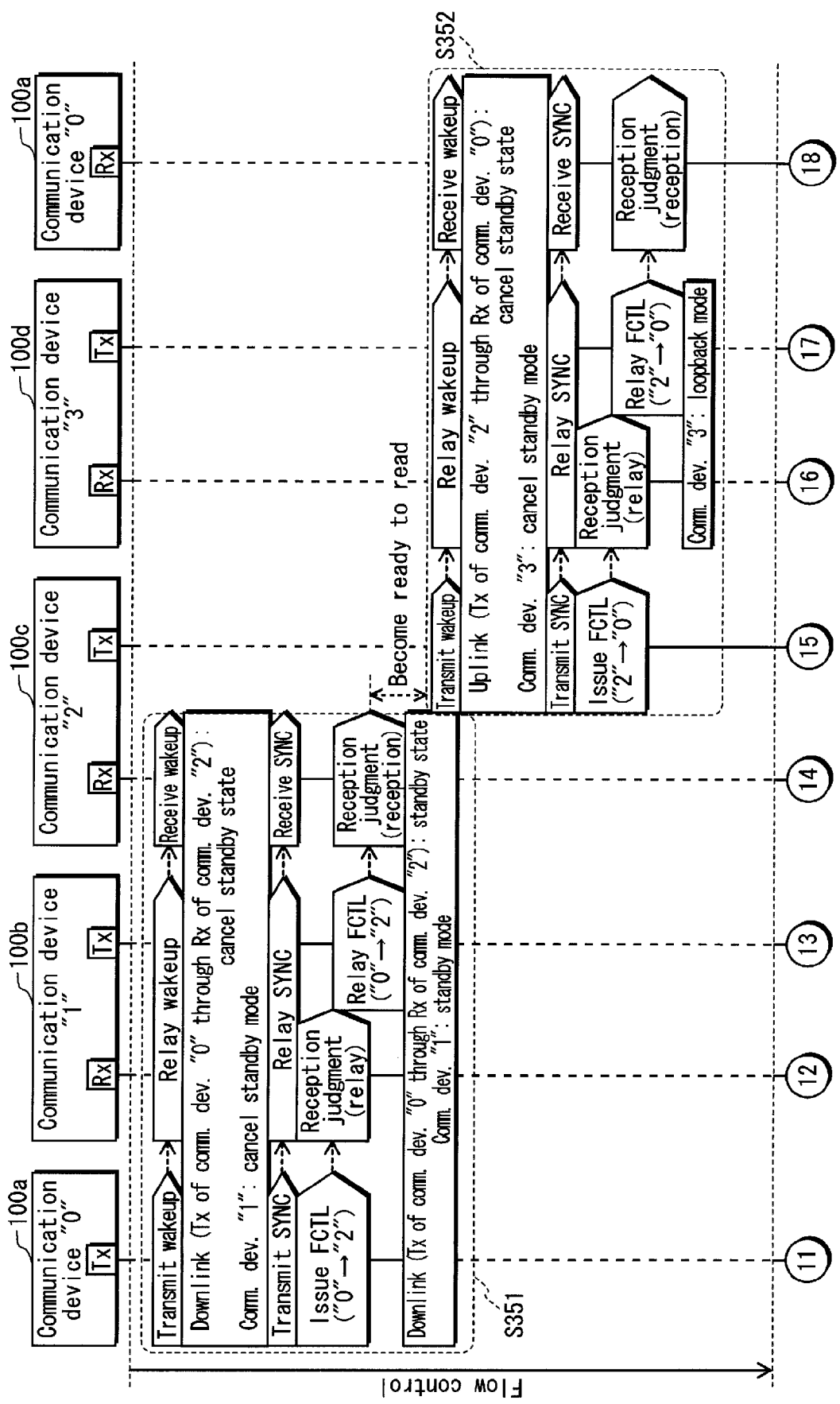
FIG. 13 shows an operational sequence for an entirety of the communication system shown in FIG. 1, the operational sequence relating to flow control, data transfer and polling and being performed upon data reading.
Figure 14:
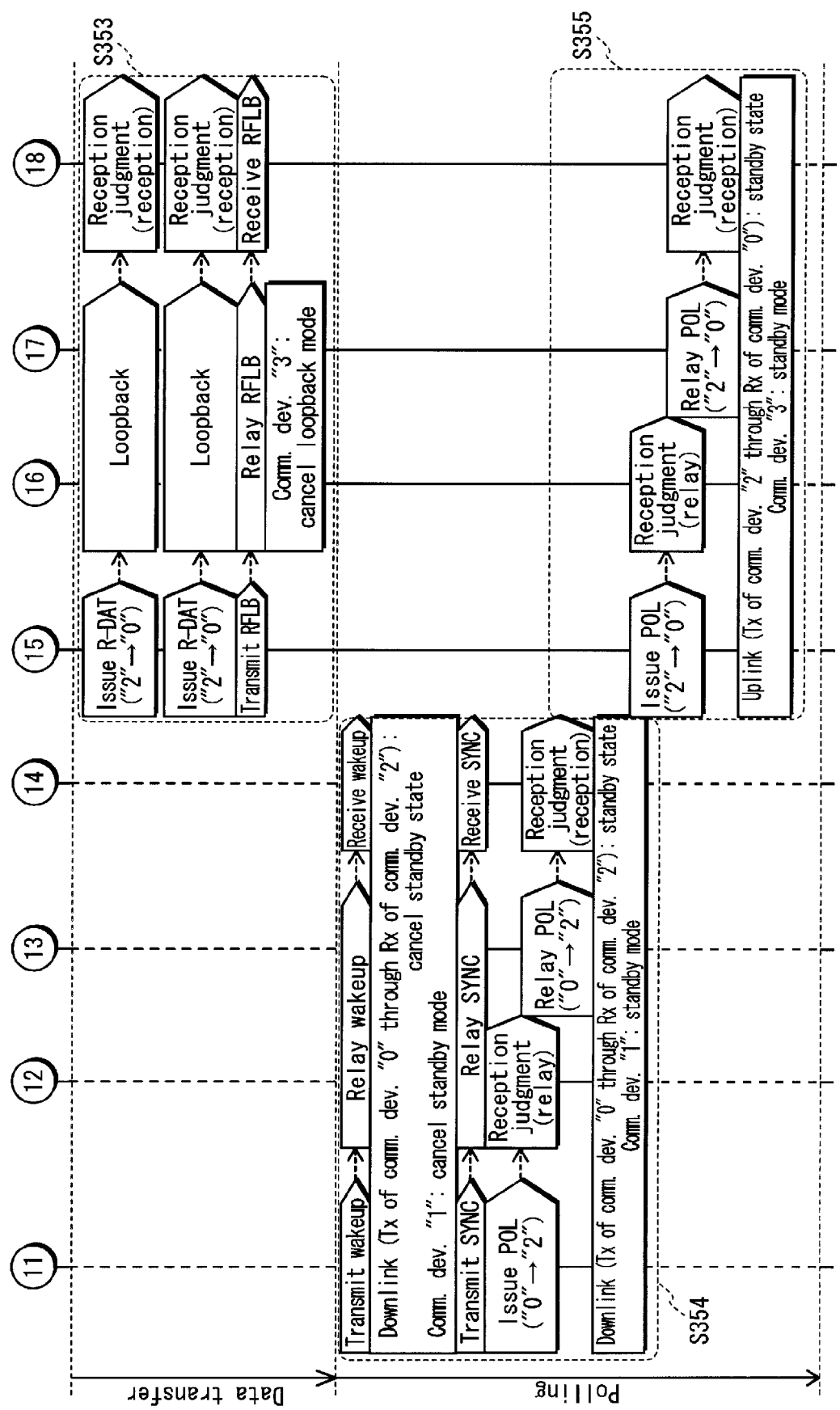
FIG. 14 shows an operational sequence for an entirety of the communication system shown in FIG. 1, the operational sequence relating to flow control, data transfer and polling and being performed upon data reading.

The operational sequences shown in FIGS. 13 and 14 relate to flow control, data transfer and polling, and follow the command processing shown in FIG. 10 in a case where the R/W flag 221 of the command packet indicates data reading.

The communication devices 100a to 100c perform processing that is substantially the same as processing of step S331 shown in FIG. 11, namely, processing ranging from transmission of the wakeup signal by the communication device 100a to reception of the synchronous codes (SYNCs) by the communication device 100c.

The command processing subunit 372 of the communication device 100a issues a flow control packet (FCTL) which is addressed to the communication device 100c and in which the loopback flag 272 is not set. This flow control packet is input to the code subunit 313 via the packet relay subunit 371, and a serial signal corresponding to this flow control packet is output from the serial transmission subunit 315 to the serial link 105.

In the communication device 100a, the command processing subunit 372 that has issued the flow control packet, in which the loopback flag 272 is not set and which thus serves as a standby packet, outputs a control signal to the standby control subunit 317 via the packet relay subunit 371, the control signal being for causing the transmitting side of the transmission/reception processing unit 301 to switch to a standby state. In response to this control signal, after the serial signal corresponding to the flow control packet is output from the serial transmission subunit 315 to the serial link 105, the standby control subunit 317 places the code subunit 313 and the serial transmission subunit 315 in the standby state.

In the communication device 100b, the serial signal corresponding to the flow control packet is input to the serial reception subunit 311, and the flow control packet is input to the packet relay subunit 371. The packet relay subunit 371 makes a judgment on the destination of the flow control packet, judges that the flow control packet is addressed to another communication device, and outputs the flow control packet to the code subunit 313. The serial signal corresponding to this flow control packet is output from the serial transmission subunit 315 to the serial link 105.

In the communication device 100b, the packet relay subunit 371 judges the flow control packet, which is addressed to another communication device and in which the loopback flag 272 is not set, as a standby packet, and outputs to the standby control subunit 317 a control signal for causing the own communication device 100b to switch to standby mode. In response to this control signal, after the serial signal corresponding to the flow control packet is output to the serial link 105, the standby control subunit 317 causes the own communication device 100b to switch to the standby mode.

In the communication device 100c, the serial signal corresponding to the flow control packet is input to the serial reception subunit 311, and the flow control packet is input to the packet relay subunit 371. The packet relay subunit 371 makes a judgment on the destination of the flow control packet, judges that the flow control packet is addressed to the own device, and outputs the flow control packet to the command processing subunit 372.

In the communication device 100c, the packet relay subunit 371 that has received the flow control packet, in which the loopback flag 272 is not set and which thus serves as a standby packet, outputs to the standby control subunit 317 a control signal for causing the receiving side of the transmission/reception processing unit 301 to switch to a standby state. In response to this control signal, the standby control subunit 317 places the serial reception subunit 311 and the decode subunit 312 in the standby state.

Through the above sequence of operations, the downlink is placed in a standby state and the communication device 100b connected to the downlink is placed in standby mode.

This concludes the description of processing performed in step S351 by the master communication device 100a and the non-master communication devices 100b and 100c of the communication system.

The communication devices 100c, 100d, and 100a perform processing that is substantially the same as processing of step S332 shown in FIG. 11, namely, processing ranging from transmission of the wakeup signal by the communication device 100c to reception of the synchronous codes (SYNCs) by the communication device 100a.

The command processing subunit 372 of the communication device 100c issues a flow control packet (FCTL) which is addressed to the communication device 100a and in which the loopback flag 272 is set. This flow control packet is input to the code subunit 313 via the packet relay subunit 371, and a serial signal corresponding to this flow control packet is output from the serial transmission subunit 315 to the serial link 105.

In the communication device 100d, the serial signal corresponding to the flow control packet is input to the serial reception subunit 311, and the flow control packet is input to the packet relay subunit 371. The packet relay subunit 371 makes a judgment on the destination of the flow control packet, judges that the flow control packet is addressed to another communication device, and outputs the flow control packet to the code subunit 313. The serial signal corresponding to this flow control packet is output from the serial transmission subunit 315 to the serial link 105.

In the communication device 100d, the packet relay subunit 371 judges the flow control packet, which is addressed to another communication device and in which the loopback flag 272 is set, as a loopback packet, and outputs to the standby control subunit 317 a control signal for causing the own communication device 100d to switch to loopback mode. In response to this control signal, after the serial signal corresponding to the flow control packet is output to the serial link 105, the standby control subunit 317 causes the own communication device 100d to switch to the loopback mode.

In the communication device 100a, the serial signal corresponding to the flow control packet is input to the serial reception subunit 311, and the flow control packet is input to the packet relay subunit 371. The packet relay subunit 371 makes a judgment on the destination of the flow control packet, judges that the flow control packet is addressed to the own device, and outputs the flow control packet to the command processing subunit 372. With this flow control packet, the command processing subunit 372 confirms that handshaking for the flow control has been established.

This concludes the description of processing performed in step S352 by the master communication device 100a and the non-master communication devices 100c and 100d of the communication system.

The data transfer subunit 373 of the communication device 100c issues a data packet (R-DAT) to the communication device 100a. This data packet is input to the code subunit 313 via the packet relay subunit 371, and a serial signal corresponding to this data packet is output from the serial transmission subunit 315 to the serial link 105.

In the communication device 100d, an input signal corresponding to the data packet from the serial link 105 arrives at the serial reception subunit 311, the standby control subunit 317, the loopback selector 314 and the serial transmission subunit 315, in this order, and then is output to the serial link 105.

In the communication device 100a, the serial signal corresponding to the data packet is input to the serial reception subunit 311, and the data packet is input to the packet relay subunit 371. The packet relay subunit 371 makes a judgment on the destination of the data packet, judges that the data packet is addressed to the own device, and outputs the data packet to the data transfer subunit 373.

The above sequence of processing is repeatedly performed until the reading of the number of data packets specified by the flow control packet is completed.

Once the reading of the number of data packets specified by the flow control packet has been completed, the data transfer subunit 373 of the communication device 100c issues loopback cancellation code (RFLB). This loopback cancellation code is input to the code subunit 313 via the packet relay subunit 371, and a serial signal corresponding to this loopback cancellation code is output from the serial transmission subunit 315 to the serial link 105.

In the communication device 100d, the input signal corresponding to the loopback cancellation code from the serial link 105 arrives at the serial reception subunit 311, the standby control subunit 317, the loopback selector 314 and the serial transmission subunit 315, in this order, and then is output to the serial link 105. At this time, the standby control subunit 317 detects the loopback cancellation code, and after the serial signal corresponding to the loopback cancellation code is output to the serial link 105, cancels the loopback mode of the own communication device 100d.

In the communication device 100a, the serial signal corresponding to the loopback cancellation code is input to the serial reception subunit 311, and the loopback cancellation code is input to the packet relay subunit 371. The packet relay subunit 371 outputs the loopback cancellation code to the data transfer subunit 373. Upon receiving the loopback cancellation code, the data transfer subunit 373 completes reception of data packets specified by the flow control size.

This concludes the description of processing performed in step S353 by the master communication device 100a and the non-master communication devices 100c and 100d of the communication system.

After completion of data transfer such as issuance of the number of data packets specified by the flow control size 271 of the flow control packet, the communication devices 100a to 100c perform (i) processing that is substantially the same as processing of step S331 in FIG. 11, namely, processing ranging from transmission of the wakeup signal by the communication device 100a to reception of the synchronous codes (SYNCs) by the communication device 100c, and (ii) processing that is substantially the same as processing of step S334 shown in FIG. 12 onward, the processing of step S334 being the issuance of the polling packet by the communication device 100a (step S354).

The communication devices 100c, 100d and 100a perform processing that is substantially the same as processing of step S335 shown in FIG. 12 onward, the processing of step S335 being the issuance of the polling packet by the communication device 100c.

FIRST MODIFICATION EXAMPLE

The following describes the first modification example with reference to the drawings. The above-described embodiment and the first modification example are different from each other in types of packets handled as standby packets, types of packets handled as loopback packets, and types of special symbols for cancelling loopback mode.

<Special Symbols of 8b/10b Scheme>

Described below with reference to FIG. 15 are special symbols of the 8b/10b scheme used by communication devices 100a to 100d pertaining to the first modification example. FIG. 15 shows one example of how the special symbols of the 8b/10b scheme, which is used by the communication devices 100a to 100d pertaining to the first modification example, are allocated to functions.

Referring to FIG. 15, SDB (Start of DATA Burst), SOP, EDB (End of DATA Burst), COM, LIDL (Logical Idle), and EOP are allocated to some of the functions. SDB and EDB respectively indicate the start and the end of data transfer corresponding to the flow control size. LIDL is used to maintain synchronization between the communication devices.

<Standby Packet and Loopback Packet>

[Loopback Packet]

In the first modification example, a communication device that is to issue a data packet issues a flow control request packet addressed to another communication device before issuing the data packet. The flow control request packet requests the destination communication device, to which the data packet is addressed, to perform flow control. The flow control request packet is the equivalent of a loopback packet. Here, the loopback flag 272 shown in FIG. 3B is not necessary, because the transfer path of the flow control request packet is also going to be the transfer path of the later-issued data packet. The flow control size 271 is not necessary, either, if its value is shared in advance.

[Standby Packet]

In the first modification example, all the packets that are issued to another communication device after completion of the initialization sequence, excluding a flow control request packet addressed to another communication device and a data packet, are considered as standby packets.

<Operations of Communication System>

[Operational Sequences for Entirety of Communication System]

The initialization sequence for an entirety of the communication system and the operational sequence relating to command processing pertaining to the first modification example are substantially the same as the operational sequence of FIG. 10 explained in the above embodiment.

(Operational Sequences Relating to Flow Control, Data Transfer and Reception Status Notification in Case of Data Writing)

Figure 16:
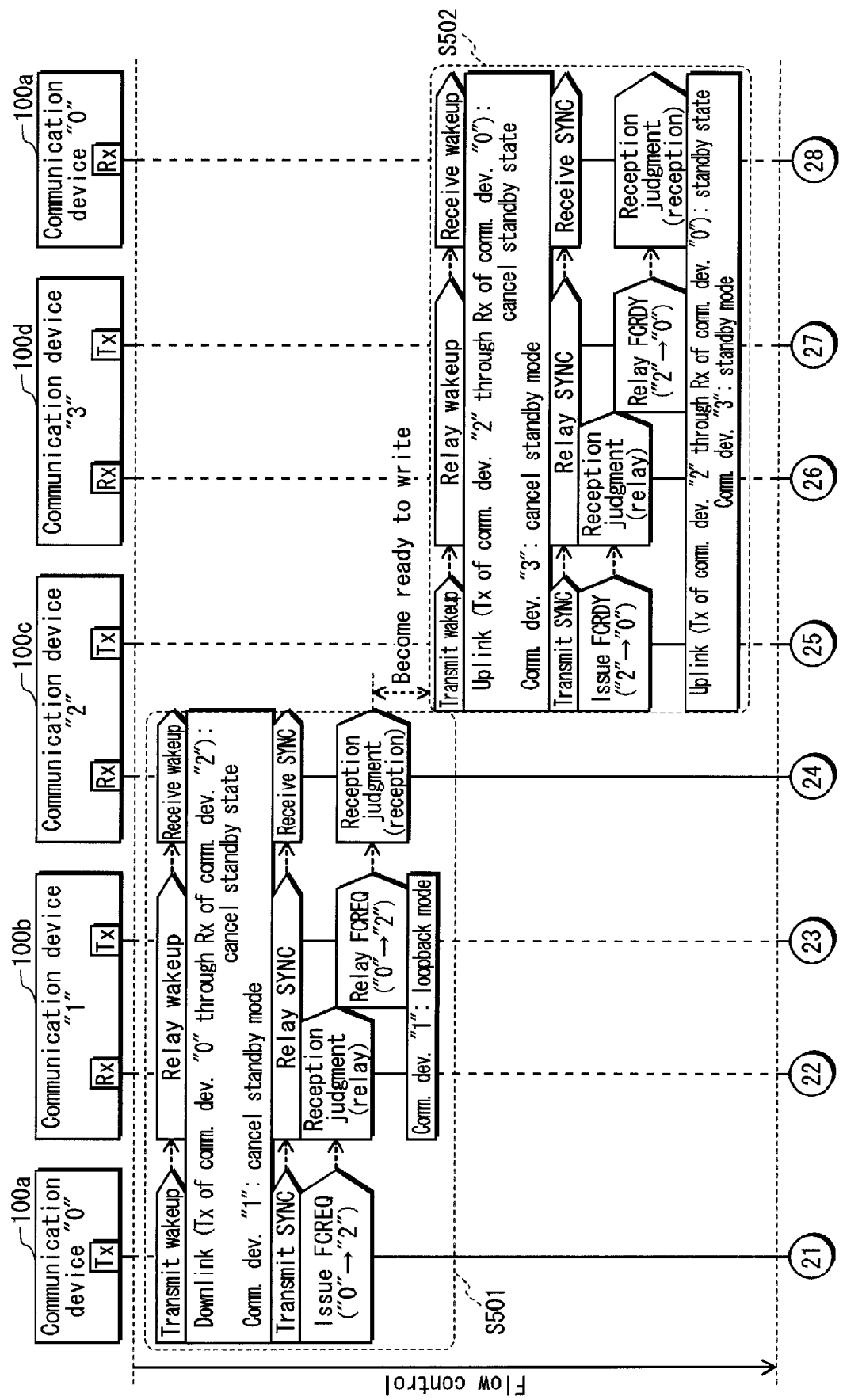
FIG. 16 shows an operational sequence for an entirety of the communication system pertaining to the first modification example, the operational sequence relating to flow control, data transfer and reception status notification and being performed upon data writing.
Figure 17:
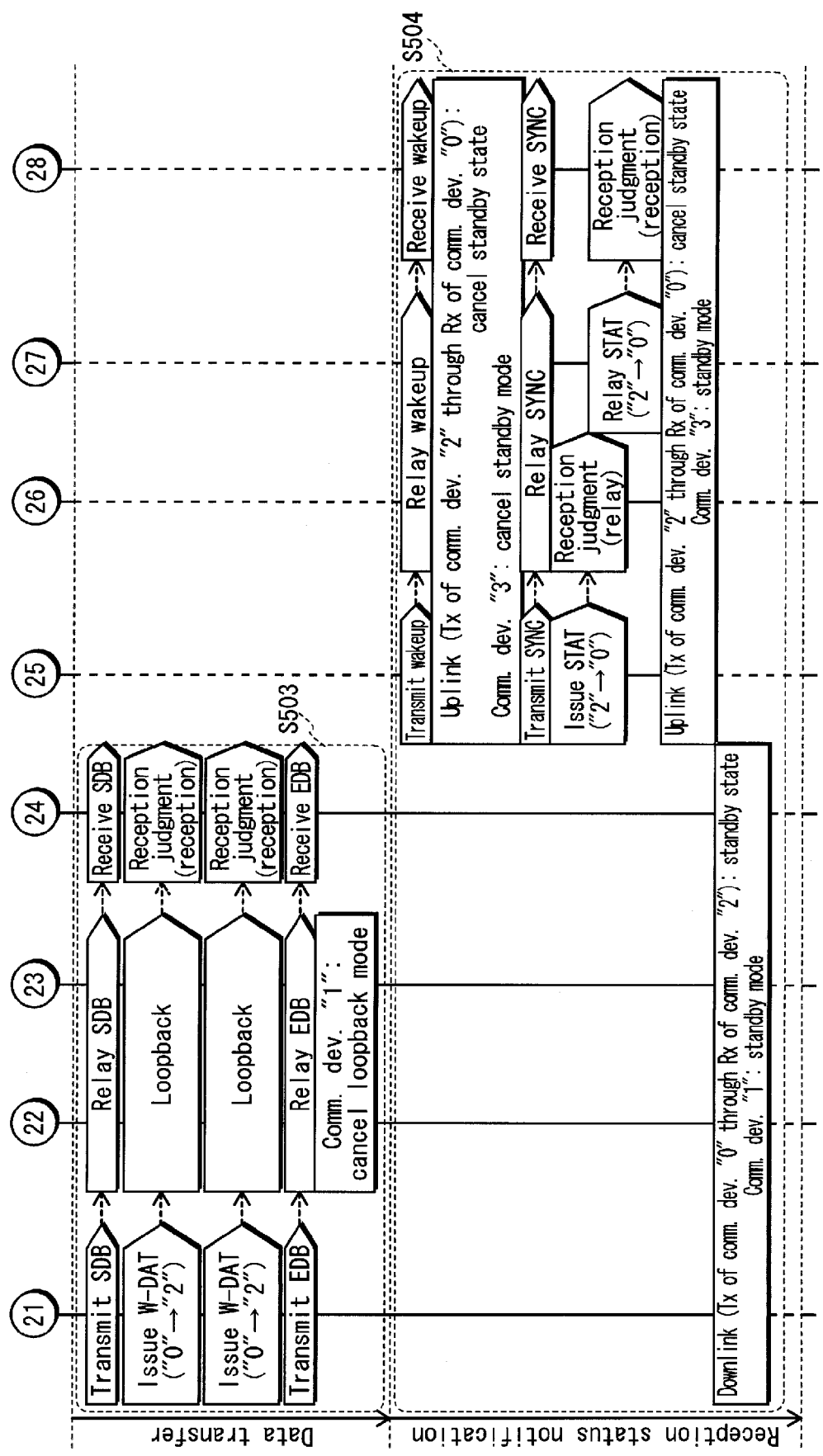
FIG. 17 shows an operational sequence for an entirety of the communication system pertaining to the first modification example, the operational sequence relating to flow control, data transfer and reception status notification and being performed upon data writing.

The operational sequences shown in FIGS. 16 and 17 relate to flow control, data transfer and reception status notification, and follow the command processing shown in FIG. 10 in a case where the R/W flag 221 of the command packet indicates data writing.

The communication devices 100a to 100c perform processing that is substantially the same as processing of step S331 shown in FIG. 11, namely, processing ranging from transmission of the wakeup signal by the communication device 100a to reception of the synchronous codes (SYNCs) by the communication device 100c.

The command processing subunit 372 of the communication device 100a issues a flow control request packet (FCREQ) to the communication device 100c. This flow control request packet is input to the code subunit 313 via the packet relay subunit 371, and a serial signal corresponding to this flow control request packet is output from the serial transmission subunit 315 to the serial link 105.

In the communication device 100b, the serial signal corresponding to the flow control request packet is input to the serial reception subunit 311, and the flow control request packet is input to the packet relay subunit 371. The packet relay subunit 371 makes a judgment on the destination of the flow control request packet, judges that the flow control request packet is addressed to another communication device, and outputs the flow control request packet to the code subunit 313. The serial signal corresponding to this flow control request packet is output from the serial transmission subunit 315 to the serial link 105.

In the communication device 100b, the packet relay subunit 371 judges the flow control request packet addressed to another communication device as a loopback packet, and outputs to the standby control subunit 317 a control signal for causing the own communication device 100*b* to switch to loopback mode. In response to this control signal, after the serial signal corresponding to the flow control request packet is output from the serial transmission subunit 315 to the serial link 105, the standby control subunit 317 causes the own communication device 100*b* to switch to the loopback mode.

In the communication device 100*c*, the serial signal corresponding to the flow control request packet is input to the serial reception subunit 311, and the flow control request packet is input to the packet relay subunit 371. The packet relay subunit 371 makes a judgment on the destination of the flow control request packet, judges that the flow control request packet is addressed to the own device, and outputs the flow control request packet to the command processing subunit 372.

This concludes the description of processing performed in step S501 by the master communication device 100*a* and the non-master communication devices 100*b* and 100*c* of the communication system.

It should be noted that even after the communication device 100*a* has issued the flow control request packet to the communication device 100*c* and the communication device 100*c* has received this flow control request packet, the communication device 100*a* keeps transmitting the LIDL, the communication device 100*b* keeps relaying the LIDL, and the communication device 100*c* keeps receiving the LIDL.

The communication devices 100*c*, 100*d*, and 100*a* perform processing that is substantially the same as processing of step S332 shown in FIG. 11, namely, processing ranging from transmission of the wakeup signal by the communication device 100*c* to reception of the synchronous codes (SYNCs) by the communication device 100*a*.

When the command processing subunit 372 of the communication device 100*c* becomes ready to write the data packet corresponding to the flow control request packet received in step S501, it issues a flow control ready packet (FCRDY) to the communication device 100*a*. This flow control ready packet is input to the code subunit 313 via the packet relay subunit 371, and a serial signal corresponding to this flow control ready packet is output from the serial transmission subunit 315 to the serial link 105.

In the communication device 100*c*, the command processing subunit 372, which has issued the flow control ready packet that serves as a standby packet, outputs a control signal to the standby control subunit 317 via the packet relay subunit 371, the control signal being for causing the transmitting side of the transmission/reception processing unit 301 to switch to a standby state. In response to this control signal, after the serial signal corresponding to the flow control ready packet is output from the serial transmission subunit 315 to the serial link 105, the standby control subunit 317 places the code subunit 313 and the serial transmission subunit 315 in the standby state.

In the communication device 100*d*, the serial signal corresponding to the flow control ready packet is input to the serial reception subunit 311, and the flow control ready packet is input to the packet relay subunit 371. The packet relay subunit 371 makes a judgment on the destination of the flow control ready packet, judges that the flow control ready packet is addressed to another communication device, and outputs the flow control ready packet to the code subunit 313. The serial signal corresponding to this flow control ready packet is output from the serial transmission subunit 315 to the serial link 105.

In the communication device 100*d*, the packet relay subunit 371 judges the flow control ready packet addressed to another communication device as a standby packet, and outputs to the standby control subunit 317 a control signal for causing the own communication device 100*d* to switch to standby mode. In response to this control signal, after the serial signal corresponding to the flow control ready packet is output from the serial transmission subunit 315 to the serial link 105, the standby control subunit 317 causes the own communication device 100*d* to switch to the standby mode.

In the communication device 100*a*, the serial signal corresponding to the flow control ready packet is input to the serial reception subunit 311, and the flow control ready packet is input to the packet relay subunit 371. The packet relay subunit 371 makes a judgment on the destination of the flow control ready packet, judges that the flow control ready packet is addressed to the own device, and outputs the flow control ready packet to the command processing subunit 372. With this flow control ready packet, the command processing subunit 372 confirms that handshaking for the flow control has been established.

In the communication device 100*a*, the packet relay subunit 371, which has received the flow control ready packet that serves as a standby packet, outputs to the standby control subunit 317 a control signal for causing the receiving side of the transmission/reception processing unit 301 to switch to a standby state. In response to this control signal, the standby control subunit 317 places the serial reception subunit 311 and the decode subunit 312 in the standby state.

Through the above sequence of operations, the uplink is placed in a standby state and the communication device 100*d* connected to the uplink is placed in standby mode.

This concludes the description of processing performed in step S502 by the master communication device 100*a* and the non-master communication devices 100*c* and 100*d* of the communication system.

Prior to transferring of data having the flow control size, the data transfer subunit 373 of the communication device 100*a* issues an SDB symbol. This SDB symbol is input to the code subunit 313 via the packet relay subunit 371, and a serial signal corresponding to the SDB symbol is output from the serial transmission subunit 315 to the serial link 105.

In the communication device 100*b*, the input signal corresponding to the SDB symbol from the serial link 105 arrives at the serial reception subunit 311, the standby control subunit 317, the loopback selector 314 and the serial transmission subunit 315, in this order, and then is output to the serial link 105.

In the communication device 100*c*, the serial signal corresponding to the SDB symbol is input to the serial reception subunit 311, and the SDB symbol is input to the packet relay subunit 371. The packet relay subunit 371 outputs the SDB symbol to the data transfer subunit 373.

Until the writing of the number of the data packets specified by the flow control request packet is completed, the communication devices 100*a* to 100*c* perform processing that is substantially the same as processing of step S333 shown in FIG. 12, namely, processing ranging from transmission of the data packet (W-DAT) by the communication device 100*a* to reception of the data packet by the communication device 100*c*.

Once the writing of the number of data packets specified by the flow control request packet has been completed, the data transfer subunit 373 of the communication device 100*a* issues an EDB symbol. This EDB symbol is input to the code subunit 313 via the packet relay subunit 371, and a serial signal corresponding to the EDB symbol is output from the serial transmission subunit 315 to the serial link 105.

In the communication device 100*b*, the input signal corresponding to the EDB symbol from the serial link 105 arrives at the serial reception subunit 311, the standby control subunit 317, the loopback selector 314 and the serial transmission subunit 315, in this order, and then is output to the serial link 105. At this time, the standby control subunit 317 detects the EDB and cancels the loopback mode of the own communication device 100b.

In the communication device 100c, the serial signal corresponding to the EDB symbol is input to the serial reception subunit 311, and the EDB symbol is input to the packet relay subunit 371. The packet relay subunit 371 outputs the EDB symbol to the data transfer subunit 373.

This concludes the description of processing performed in step S503 by the master communication device 100a and the non-master communication devices 100b and 100c of the communication system.

It should be noted that even after the transmission/reception of the EDB symbol, the communication device 100a keeps transmitting the LIDL, the communication device 100b keeps relaying the LIDL, and the communication device 100c keeps receiving the LIDL.

The communication devices 100c, 100d, and 100a perform processing that is substantially the same as processing of step S335 shown in FIG. 12, namely, processing ranging from transmission of the wakeup signal by the communication device 100c to reception of the synchronous codes (SYNCs) by the communication device 100a.

The command processing subunit 372 of the communication device 100c issues a status packet (STAT) that is addressed to the communication device 100a to notify the result of receiving data packets. This status packet is input to the code subunit 313 via the packet relay subunit 371, and a serial signal corresponding to this status packet is output from the serial transmission subunit 315 to the serial link 105.

In the communication device 100c, the command processing subunit 372, which has issued the status packet that serves as a standby packet, outputs a control signal to the standby control subunit 317 via the packet relay subunit 371, the control signal being for causing the transmitting side of the transmission/reception processing unit 301 to switch to a standby state. In response to this control signal, after the serial signal corresponding to the status packet is output to the serial link 105, the standby control subunit 317 places the code subunit 313 and the serial transmission subunit 315 in the standby state.

In the communication device 100d, the serial signal corresponding to the status packet is input to the serial reception subunit 311, and the status packet is input to the packet relay subunit 371. The packet relay subunit 371 makes a judgment on the destination of the status packet, judges that the status packet is addressed to another communication device, and outputs the status packet to the code subunit 313. A serial signal corresponding to this status packet is output from the serial transmission subunit 315 to the serial link 105.

In the communication device 100d, the packet relay subunit 371 judges the status packet addressed to another communication device as a standby packet, and outputs to the standby control subunit 317 a control signal for causing the own communication device 100d to switch to standby mode. In response to this control signal, after the serial signal corresponding to the status packet is output from the serial transmission subunit 315 to the serial link 105, the standby control subunit 317 causes the own communication device 100d to switch to the standby mode.

In the communication device 100a, the serial signal corresponding to the status packet is input to the serial reception subunit 311, and the status packet is input to the packet relay subunit 371. The packet relay subunit 371 makes a judgment on the destination of the status packet, judges that the status packet is addressed to the own device, and outputs the status packet to the command processing subunit 372.

In the communication device 100a, the packet relay subunit 371, which has received the status packet that serves as a standby packet, outputs to the standby control subunit 317 a control signal for causing the receiving side of the transmission/reception processing unit 301 to switch to a standby state. In response to this control signal, the standby control subunit 317 places the serial reception subunit 311 and the decode subunit 312 in the standby state.

On the occasion of reception of the status packet that serves as a standby packet, the relay processing subunit 371 of the communication device 100a further outputs to the standby control subunit 317 a control signal for causing the transmitting side of the transmission/reception processing unit 301 in a standby state. In response to this control signal, the standby control subunit 317 places the code subunit 313 and the serial transmission subunit 315 in a standby state.

Although the communication device 100a has kept transmitting the LIDL even after the transmission/reception of the EDB symbol, the communication device 100a stops transmission of the LIDL once the transmitting side of the transmission/reception processing unit 301 has been placed in the standby state. When the communication device 100b no longer receives the LIDL—for instance, when the wakeup detection subunit 316 detects that the serial link 105 is in an electrically idle state, the wakeup detection subunit 316 outputs to the standby control subunit 317 a control signal for causing the own communication device 100b to switch to standby mode. In response to this control signal, the standby control subunit 317 causes the own communication device 100b to switch to the standby mode.

When the transmission of the LIDL from the communication device 100b has stopped and the communication device 100c no longer receives the LIDL—for instance, when the wakeup detection subunit 316 detects that the serial link 105 is in an electrically idle state, the wakeup detection subunit 316 outputs to the standby control subunit 317 a control signal for causing the receiving side of the transmission/reception processing unit 301 to switch to a standby state. In response to this control signal, the standby control subunit 317 places the serial reception subunit 311 and the decode subunit 312 in the standby state.

As such, on the occasion of the issuance of the status packet by the command processing subunit 372 of the communication device 100c, the downlink switches to the standby state and the communication device 100b connected to the downlink switches to the standby mode.

Through the above sequence of operations, the uplink is placed in a standby state and the communication device 100d connected to the uplink is placed in standby mode. Also, the downlink is placed in a standby state and the communication device 100b connected to the downlink is placed in standby mode.

This concludes the description of processing performed in step S504 by the master communication device 100a and the non-master communication devices 100b to 100d of the communication system.

(Operational Sequences Relating to Flow Control, Data Transfer and Reception Status Notification in Case of Data Writing)

Figure 18:
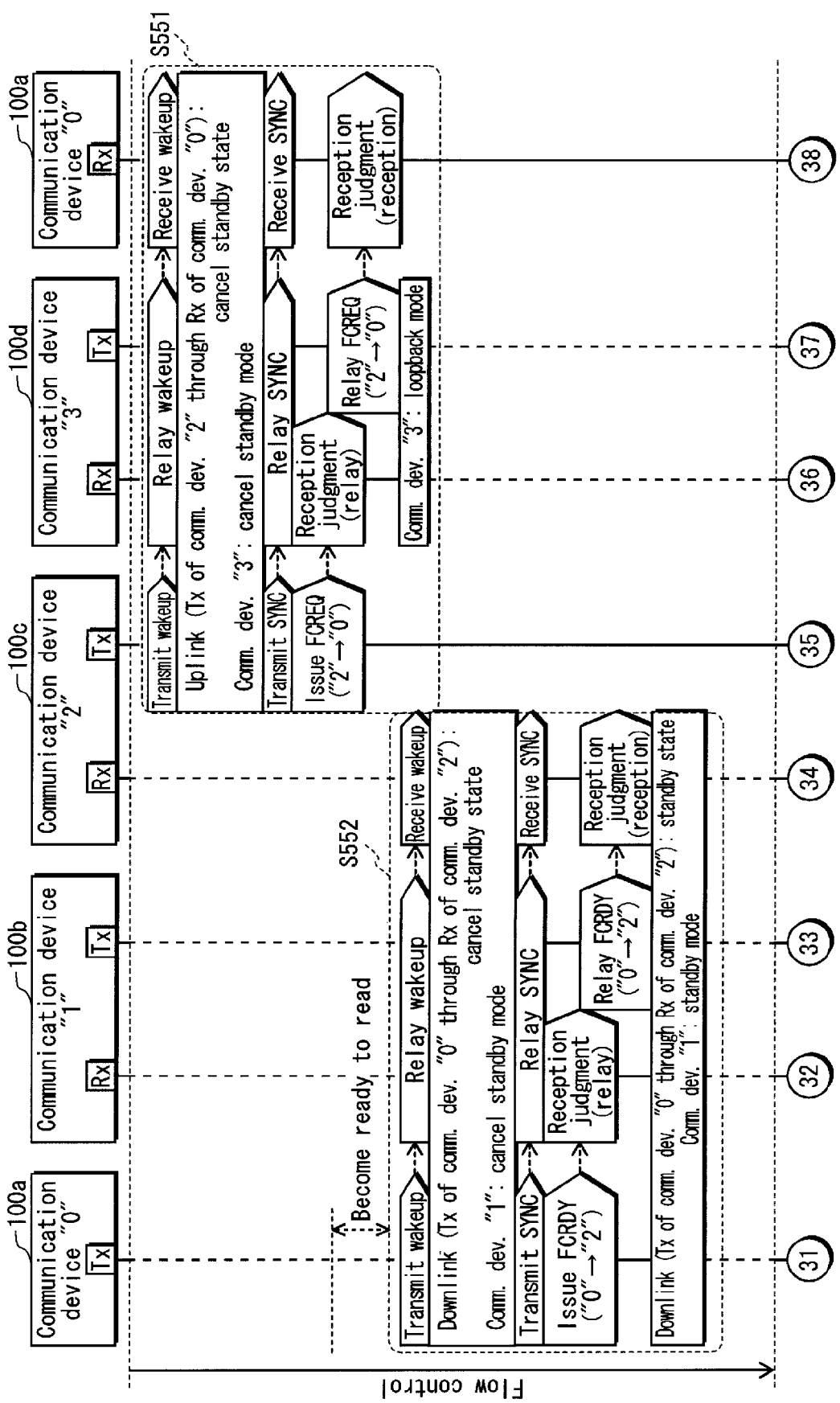
FIG. 18 shows an operational sequence for an entirety of the communication system pertaining to the first modification example, the operational sequence relating to flow control, data transfer and reception status notification and being performed upon data reading.
Figure 19:
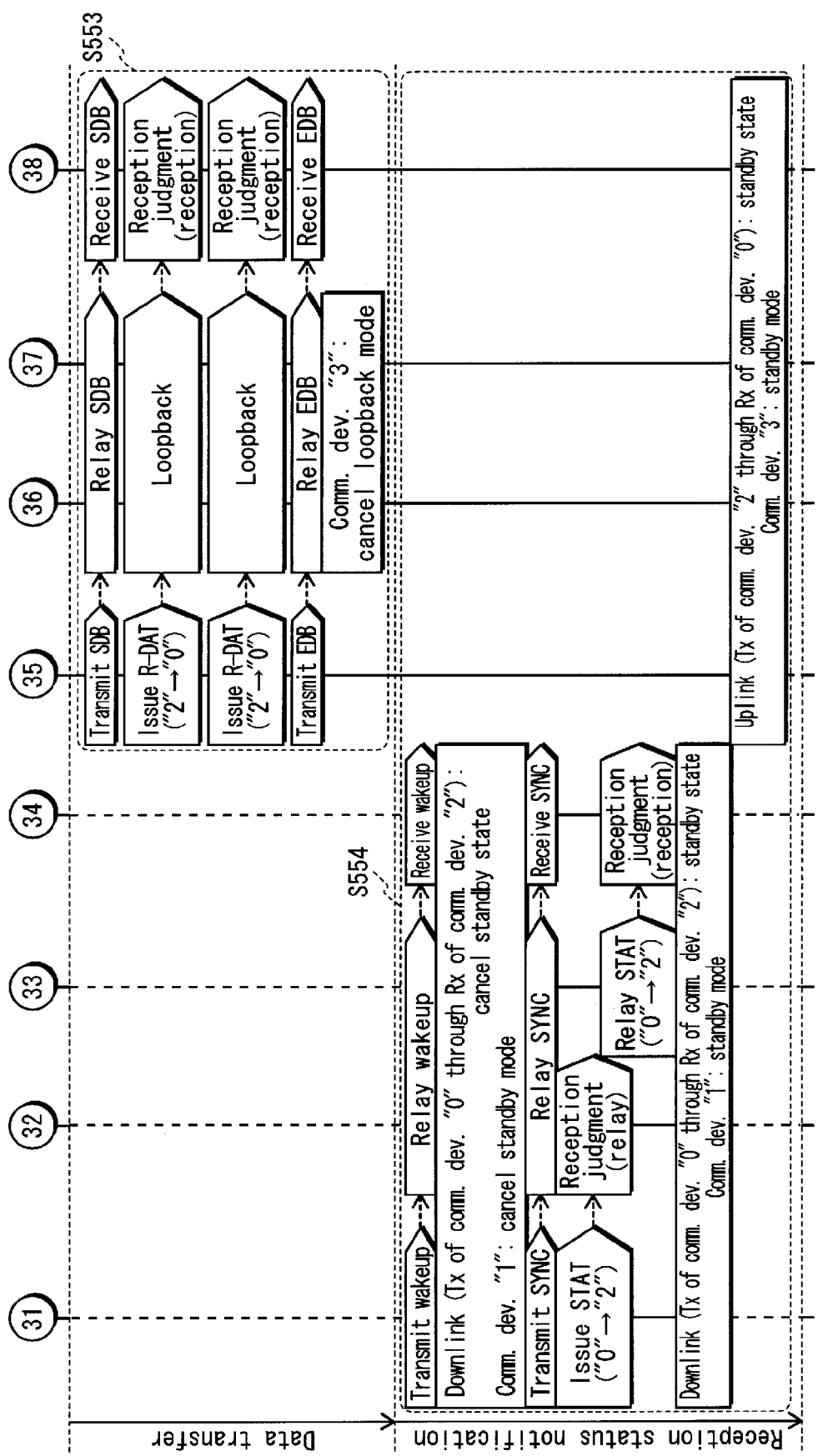
FIG. 19 shows an operational sequence for an entirety of the communication system pertaining to the first modification example, the operational sequence relating to flow control, data transfer and reception status notification and being performed upon data reading.

The operational sequences shown in FIGS. 18 and 19 relate to flow control, data transfer and reception status notification, and follow the command processing shown in FIG. 10 in a case where the R/W flag 221 of the command packet indicates data reading.

The communication devices 100c, 100d, and 100a perform processing that is substantially the same as processing of step S332 shown in FIG. 11, namely, processing ranging from transmission of the wakeup signal by the communication device 100c to reception of the synchronous codes (SYNCs) by the communication device 100a.

The command processing subunit 372 of the communication device 100c issues a flow control request packet (FCREQ) to the communication device 100a. This flow control request packet is input to the code subunit 313 via the packet relay subunit 371, and a serial signal corresponding to this flow control request packet is output from the serial transmission subunit 315 to the serial link 105.

In the communication device 100d, the serial signal corresponding to the flow control request packet is input to the serial reception subunit 311, and the flow control request packet is input to the packet relay subunit 371. The packet relay subunit 371 makes a judgment on the destination of the flow control request packet, judges that the flow control request packet is addressed to another communication device, and outputs the flow control request packet to the code subunit 313. The serial signal corresponding to this flow control request packet is output from the serial transmission subunit 315 to the serial link 105.

In the communication device 100d, the packet relay subunit 371 judges the flow control request packet addressed to another communication device as a loopback packet, and outputs to the standby control subunit 317 a control signal for causing the own communication device 100d to switch to loopback mode. In response to this control signal, after the serial signal corresponding to the flow control request packet is output from the serial transmission subunit 315 to the serial link 105, the standby control subunit 317 causes the own communication device 100d to switch to the loopback mode.

In the communication device 100a, the serial signal corresponding to the flow control request packet is input to the serial reception subunit 311, and the flow control request packet is input to the packet relay subunit 371. The packet relay subunit 371 makes a judgment on the destination of the flow control request packet, judges that the flow control request packet is addressed to the own device, and outputs the flow control request packet to the command processing subunit 372.

This concludes the description of processing performed in step S551 by the master communication device 100a and the non-master communication devices 100c and 100d of the communication system.

It should be noted that even after the communication device 100c has issued the flow control request packet to the communication device 100a and the communication device 100a has received this flow control request packet, the communication device 100c keeps transmitting the LIDL, the communication device 100d keeps relaying the LIDL, and the communication device 100a keeps receiving the LIDL.

The communication devices 100a to 100c perform processing that is substantially the same as processing of step S331 shown in FIG. 11, namely, processing ranging from transmission of the wakeup signal by the communication device 100a to reception of the synchronous codes (SYNCs) by the communication device 100c.

When the command processing subunit 372 of the communication device 100a becomes ready to read data packets corresponding to the flow control request packet received in step S551, it issues a flow control ready packet (FCRDY) to the communication device 100c. This flow control ready packet is input to the code subunit 313 via the packet relay subunit 371, and a serial signal corresponding to this flow control ready packet is output from the serial transmission subunit 315 to the serial link 105.

In the communication device 100a, the command processing subunit 372, which has issued the flow control ready packet that serves as a standby packet, outputs a control signal to the standby control subunit 317 via the packet relay subunit 371, the control signal being for causing the transmitting side of the transmission/reception processing unit 301 to switch to a standby state. In response to this control signal, after the serial signal corresponding to the flow control ready packet is output from the serial transmission subunit 315 to the serial link 105, the standby control subunit 317 places the code subunit 313 and the serial transmission subunit 315 in the standby state.

In the communication device 100b, the serial signal corresponding to the flow control ready packet is input to the serial reception subunit 311, and the flow control ready packet is input to the packet relay subunit 371. The packet relay subunit 371 makes a judgment on the destination of the flow control ready packet, judges that the flow control ready packet is addressed to another communication device, and outputs the flow control ready packet to the code subunit 313. The serial signal corresponding to this flow control ready packet is output from the serial transmission subunit 315 to the serial link 105.

In the communication device 100b, the packet relay subunit 371 judges the flow control ready packet addressed to another communication device as a standby packet, and outputs to the standby control subunit 317 a control signal for causing the own communication device 100b to switch to standby mode. In response to this control signal, after the serial signal corresponding to the flow control ready packet is output from the serial transmission subunit 315 to the serial link 105, the standby control subunit 317 causes the own communication device 100b to switch to the standby mode.

In the communication device 100c, the serial signal corresponding to the flow control ready packet is input to the serial reception subunit 311, and the flow control ready packet is input to the packet relay subunit 371. The packet relay subunit 371 makes a judgment on the destination of the flow control ready packet, judges that the flow control ready packet is addressed to the own device, and outputs the flow control ready packet to the command processing subunit 372. With this flow control ready packet, the command processing subunit 372 confirms that handshaking for the flow control has been established.

In the communication device 100c, the packet relay subunit 371, which has received the flow control ready packet that serves as a standby packet, outputs to the standby control subunit 317 a control signal for causing the receiving side of the transmission/reception processing unit 301 to switch to a standby state. In response to this control signal, the standby control subunit 317 places the serial reception subunit 311 and the decode subunit 312 in the standby state.

Through the above sequence of operations, the downlink is placed in a standby state and the communication device 100b connected to the downlink is placed in standby mode.

This concludes the description of processing performed in step S552 by the master communication device 100a and the non-master communication devices 100b and 100c of the communication system.

Prior to transferring of data having the flow control size, the data transfer subunit 373 of the communication device 100c issues an SDB symbol. This SDB symbol is input to the code subunit 313 via the packet relay subunit 371, and a serial signal corresponding to this SDB symbol is output from the serial transmission subunit 315 to the serial link 105.

In the communication device 100*d*, an input signal corresponding to the SDB symbol from the serial link 105 arrives at the serial reception subunit 311, the standby control subunit 317, the loopback selector 314 and the serial transmission subunit 315, in this order, and then is output to the serial link 105.

In the communication device 100*a*, the serial signal corresponding to the SDB symbol is input to the serial reception subunit 311, and the SDB symbol is input to the packet relay subunit 371. The packet relay subunit 371 outputs the SDB symbol to the data transfer subunit 373.

Until completion of the reading of the number of data packets specified by the flow control ready packet, the communication devices 100*c*, 100*d* and 100*a* perform processing that is substantially the same as processing of step S353 shown in FIG. 14, namely, processing ranging from transmission of the data packet (R-DAT) by the communication device 100*c* to reception of the data packet by the communication device 100*a*.

Once the reading of the number of data packets specified by the flow control request packet has been completed, the data transfer subunit 373 of the communication device 100*c* issues an EDB symbol. This EDB symbol is input to the code subunit 313 via the packet relay subunit 371, and a serial signal corresponding to this EDB symbol is output from the serial transmission subunit 315 to the serial link 105.

In the communication device 100*d*, an input signal corresponding to the EDB symbol from the serial link 105 arrives at the serial reception subunit 311, the standby control subunit 317, the loopback selector 314 and the serial transmission subunit 315, in this order, and then is output to the serial link 105. At this time, the standby control subunit 317 detects the EDB and cancels the loopback mode of the own communication device 100*d*.

In the communication device 100*a*, the serial signal corresponding to the EDB symbol is input to the serial reception subunit 311, and the EDB symbol is input to the packet relay subunit 371. The packet relay subunit 371 outputs the EDB symbol to the data transfer subunit 373.

This concludes the description of processing performed in step S553 by the master communication device 100*a* and the non-master communication devices 100*c* and 100*d* of the communication system.

It should be noted that even after the transmission/reception of the EDB symbol, the communication device 100*c* keeps transmitting the LIDL, the communication device 100*d* keeps relaying the LIDL, and the communication device 100*a* keeps receiving the LIDL.

The communication devices 100*a* to 100*c* perform processing that is substantially the same as processing of step S331 shown in FIG. 11, namely, processing ranging from transmission of the wakeup signal by the communication device 100*a* to reception of the synchronous codes (SYNCs) by the communication device 100*c*.

The command processing subunit 372 of the communication device 100*a* issues a status packet (STAT) to the communication device 100*c*. This status packet is input to the code subunit 313 via the packet relay subunit 371, and a serial signal corresponding to this status packet is output from the serial transmission subunit 315 to the serial link 105.

In the communication device 100*a*, the command processing subunit 372, which has issued the status packet that serves as a standby packet, outputs a control signal to the standby control subunit 317 via the packet relay subunit 371, the control signal being for causing the transmitting side of the transmission/reception processing unit 301 to switch to a standby state. In response to this control signal, after the serial signal corresponding to the status packet is output to the serial link 105, the standby control subunit 317 places the code subunit 313 and the serial transmission subunit 315 in the standby state.

In the communication device 100*b*, the serial signal corresponding to the status packet is input to the serial reception subunit 311, and the status packet is input to the packet relay subunit 371. The packet relay subunit 371 makes a judgment on the destination of the status packet, judges that the status packet is addressed to another communication device, and outputs the status packet to the code subunit 313. A serial signal corresponding to this status packet is output from the serial transmission subunit 315 to the serial link 105.

In the communication device 100*b*, the packet relay subunit 371 judges the status packet addressed to another communication device as a standby packet, and outputs to the standby control subunit 317 a control signal for causing the own communication device 100*b* to switch to standby mode. In response to this control signal, after the serial signal corresponding to the status packet is output from the serial transmission subunit 315 to the serial link 105, the standby control subunit 317 causes the own communication device 100*b* to switch to the standby mode.

In the communication device 100*c*, the serial signal corresponding to the status packet is input to the serial reception subunit 311, and the status packet is input to the packet relay subunit 371. The packet relay subunit 371 makes a judgment on the destination of the status packet, judges that the status packet is addressed to the own device, and outputs the status packet to the command processing subunit 372.

In the communication device 100*c*, the packet relay subunit 371, which has received the status packet that serves as a standby packet, outputs to the standby control subunit 317 a control signal for causing the receiving side of the transmission/reception processing unit 301 to switch to a standby state. In response to this control signal, the standby control subunit 317 places the serial reception subunit 311 and the decode subunit 312 in the standby state.

On the occasion of reception of the status packet that serves as a standby packet, the relay processing subunit 371 of the communication device 100*c* further outputs to the standby control subunit 317 a control signal for causing the transmitting side of the transmission/reception processing unit 301 in a standby state. In response to this control signal, the standby control subunit 317 places the code subunit 313 and the serial transmission subunit 315 in a standby state.

Although the communication device 100*c* has kept transmitting the LIDL even after the transmission/reception of the EDB symbol, the communication device 100*c* stops transmission of the LIDL once the transmitting side of the transmission/reception processing unit 301 has been placed in the standby state. When the communication device 100*d* no longer receives the LIDL—for instance, when the wakeup detection subunit 316 detects that the serial link 105 is in an electrically idle state, the wakeup detection subunit 316 outputs to the standby control subunit 317 a control signal for causing the own communication device 100*d* to switch to standby mode. In response to this control signal, the standby control subunit 317 causes the own communication device 100*d* to switch to the standby mode.

When the transmission of the LIDL from the communication device 100*d* has stopped and the communication device 100*a* no longer receives the LIDL—for instance, when the wakeup detection subunit 316 detects that the serial link 105 is in an electrically idle state, the wakeup detection subunit 316 outputs to the standby control subunit 317 a control signal for causing the receiving side of the transmission/reception processing unit 301 to switch to a standby state. In response to this control signal, the standby control subunit 317 places the serial reception subunit 311 and the decode subunit 312 in the standby state.

As such, on the occasion of the issuance of the status packet by the command processing subunit 372 of the communication device 100a, the uplink switches to the standby state and the communication device 100d connected to the uplink switches to the standby mode.

Through the above sequence of operations, the downlink is placed in a standby state and the communication device 100b connected to the downlink is placed in standby mode. Also, the uplink is placed in a standby state and the communication device 100d connected to the downlink is placed in standby mode.

This concludes the description of processing performed in step S554 by the master communication device 100a and the non-master communication devices 100b to 100d of the communication system.

SECOND MODIFICATION EXAMPLE

The following describes the second modification example with reference to the drawings. In the above embodiment, each of the communication devices in the communication system includes the clock source 303 constituted by, for example, a voltage-controlled crystal oscillator (VCXO). As opposed to this, in the second modification example, one of communication devices in the communication system includes the clock source. Alternatively, one or more of communication devices in the communication system may each include the clock source.
<System Structure of Communication System>
FIG. 20 shows a system structure of a communication system pertaining to the second modification example.

Figure 20:
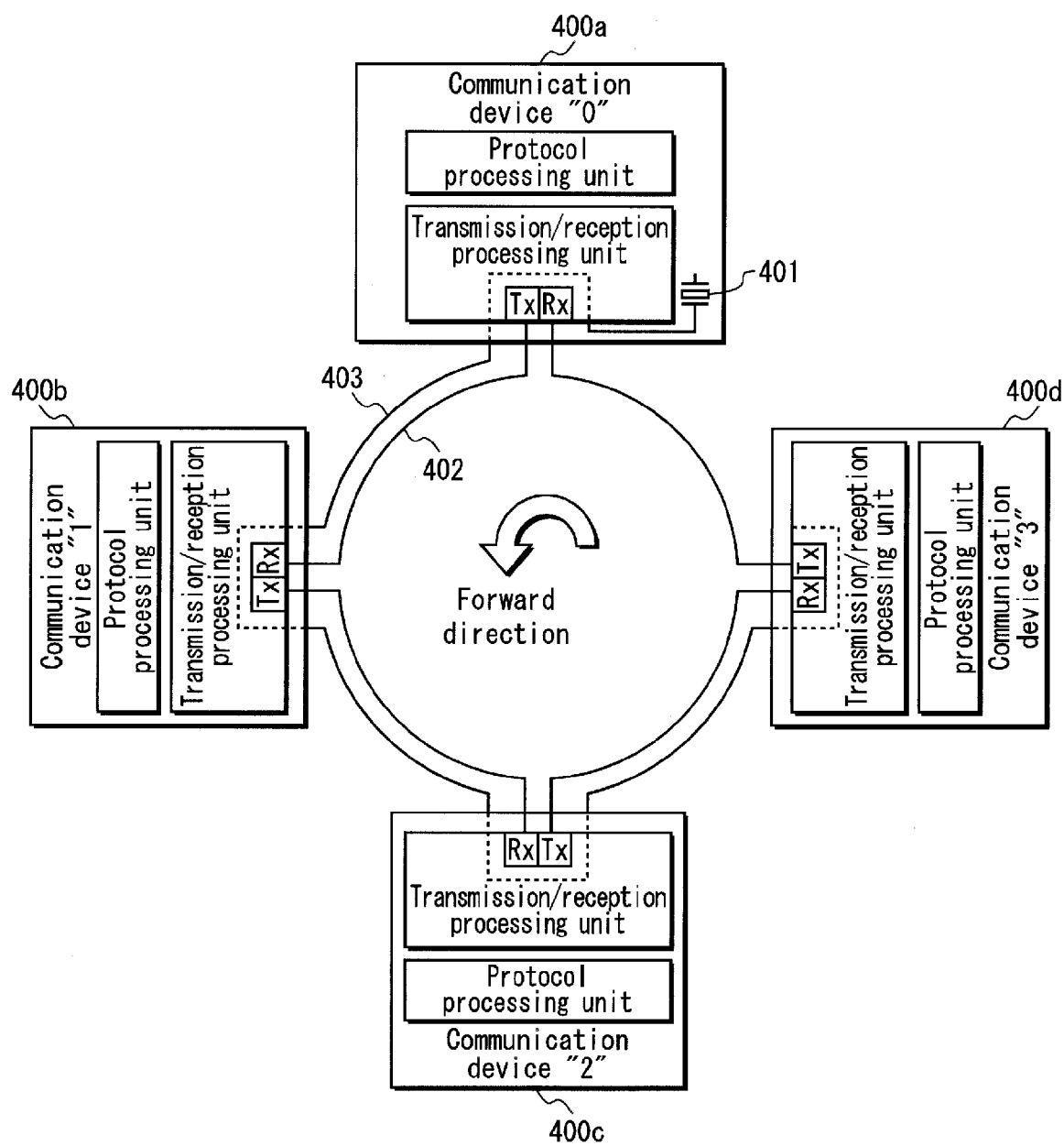
FIG. 20 shows a system structure of a communication system pertaining to the second modification example.

In the communication system shown in FIG. 20, four communication devices 400a through 400d are connected with one another via a serial link 402. Here, the communication device 400a is a master communication device, and the communication devices 400b to 400d are slave communication devices. It should be noted that, except for the structure of the clock source, the communication device 400a is structured the same as the communication device 100a, and the communication devices 400b to 400d are structured the same as the communication devices 100b to 100d, respectively.

The communication device 400a includes a clock source 401, and each of the communication device 400a to 400d is structured such that it can relay a reference clock. The communication system has a common clock structure in which the reference clock output from the clock source 401 is propagated through a clock communication channel 403 that coexists with the serial link 402 for data transfer.
<<Supplementary Notes>>
The present invention is not limited to the contents explained in the above embodiment, and can be implemented in any embodiment that can achieve the aim of the present invention and other aims that relate to or accompany the aim of the present invention. For example, the following cases are possible.

(1) In the above embodiment and modification examples, the number of non-master communication devices connected to each of the serial links 105 and 402 is three. However, the present invention is not limited to this. The number of non-master communication devices may be two, or four or more.

(2) In the above embodiment and modification examples, the decode subunit 312 and the code subunit 313 use the 8b/10b scheme for data conversion. However, the present invention is not limited to this. Instead, the 64b/66b scheme or other schemes may be used for data conversion.

(3) The above embodiment and modification examples have explained the structure in which data output from the S/P converter 333 is routed in loopback. However, the present invention is not limited to this. The present invention may have the structure in which data output from the CDR circuit 332 is routed in loopback.

(4) According to the above embodiment and modification examples, a packet designed for a certain use is also used for a different purpose in the form of a standby packet and a loopback packet. However, the present invention is not limited to this. It is permissible to prepare a packet for exclusive use as a standby packet and a loopback packet.

(5) A method for flow control is not limited to the ones explained in the above embodiment and modification examples.

(6) The polling packet used in the above embodiment and modification examples may be broadcast.

(7) The communication devices of the above embodiment and modification examples may each be realized as, for example, an LSI which is an integrated circuit. Each of constituent elements of the communication devices may be mounted on one chip. Alternatively, all or part of such constituent elements may be mounted on one chip. Although referred to here as an LSI, depending on the degree of integration, the terms IC, system LSI, super LSI, or ultra LSI are used. In addition, the method for assembling integrated circuits is not limited to the LSI, and a dedicated circuit or a general-purpose processor may be used. An FPGA (Field Programmable Gate Array), which is programmable after the LSI is manufactured, or a reconfigurable processor, which allows reconfiguration of the connection and setting of circuit cells inside the LSI, may be used. Furthermore, if technology for forming integrated circuits that replaces LSIs emerges, owing to advances in semiconductor technology or to another derivative technology, the integration of function blocks may naturally be accomplished using such technology. The application of biotechnology or the like is possible.

(8) The contents of the above embodiment and the contents of the above supplementary notes may be combined as necessary.

INDUSTRIAL APPLICABILITY

The present invention is useful in a communication system or the like that aims to reduce the amount of power consumed in a case where data transfer is performed between a plurality of communication devices and the like connected in a ring via a serial link.

REFERENCE SIGNS LIST 100a to 100d communication device
101a to 101d protocol processing unit
102a to 102d transmission/reception processing unit
103a to 103d serial transmission subunit
104a to 104d serial reception subunit
105 serial link
300 communication device
301 transmission/reception processing unit
302 protocol processing unit
303 clock source
311 serial reception subunit
312 decode subunit
313 code subunit
314 loopback selector 315 serial transmission subunit
316 wakeup detection subunit
317 standby control subunit
318 loopback path
331 serial receiver
332 CDR circuit
333 serial-to-parallel converter (S/P converter)
336 PLL circuit
351 parallel-to-serial converter (P/S converter)
352 serial driver
371 packet relay subunit
372 command processing subunit
373 data transfer subunit

The invention claimed is:

1. A communication system including a first communication device and a plurality of second communication devices, the first communication device and the second communication devices being connected with one another in a ring via a serial link, wherein
the first communication device comprises:
a first command processing unit configured to, when a downlink is not used for data packet transfer, issue a standby packet to a partner device that is one of the second communication devices with which the first communication device performs communication, the downlink being a part of the serial link extending from the first communication device to the partner device; and
a first data transfer unit configured to (i) transmit a write data packet to be written via the downlink, and (ii) receive a read data packet to be read via an uplink, which is a part of the serial link extending from the partner device to the first communication device, and
each of the second communication devices comprises:
a second command processing unit configured to, when the uplink is not used for the data packet transfer and a respective one of the second communication devices is the partner device, issue the standby packet to the first communication device;
a second data transfer unit configured to receive the write data packet via the downlink and transmit the read data packet via the uplink;
a packet relay unit configured to, in accordance with a destination of a packet input to a respective one of the second communication devices, relay the input packet to one of the first and second communication devices that immediately succeeds a respective one of the second communication devices in the ring; and
a standby control unit configured to, when the input packet relayed by the packet relay unit of a respective one of the second communication devices is the standby packet, cause a respective one of the second communication devices to switch to standby mode.

2. The communication system of claim 1, wherein
the first command processing unit issues a loopback packet to the partner device when the downlink is used for the data packet transfer,
each of the second command processing units issues the loopback packet to the first communication device when the uplink is used for the data packet transfer and a respective one of the second communication devices is the partner device, and
each of the standby control units causes a respective one of the second communication devices to switch to loopback mode when the input packet relayed by the packet relay unit of a respective one of the second communication devices is the loopback packet.

3. The communication system of claim 2, wherein
each of the first command processing unit and the second command processing units performs transmission and reception of a flow control packet via the downlink and the uplink,
the flow control packet is the standby packet when transmitted via one of the downlink and the uplink that is not used for the data packet transfer, and
the flow control packet is the loopback packet when transmitted via one of the downlink and the uplink that is used for the data packet transfer.

4. The communication system of claim 2, wherein
the first command processing unit issues a flow control request packet to the partner device in order to write the write data packet, and in response to the flow control request packet, the second command processing unit of the partner device issues a flow control ready packet to the first communication device,
the second command processing unit of the partner device issues the flow control request packet to the first communication device in order for the read data packet to be read, and in response to the flow control request packet, the first command processing unit issues the flow control ready packet to the partner device, and
the flow control request packet is the loopback packet, and the flow control ready packet is the standby packet.

5. The communication system of claim 2, wherein
when a respective one of the second communication devices is a transmitter of the write data packet or the read data packet, each of the first data transfer unit and the second data transfer units transmits a loopback cancellation signal at an end of transfer of data having a predetermined size, the loopback cancellation signal cancelling the loopback mode of one or more of the second communication devices that have switched to the loopback mode, and
each of the standby control units cancels the loopback mode of a respective one of the second communication devices in accordance with detection of the loopback cancellation signal.

6. The communication system of claim 5, wherein
when a respective one of the second communication devices is a receiver of the write data packet or the read data packet, each of the first command processing unit and the second command processing units transmits a wakeup signal after the transfer of the data having the predetermined size, the wakeup signal cancelling the standby mode of one or more of the second communication devices that have switched to the standby mode,
each of the first command processing unit and the second command processing units issues a polling packet to which each of the second communication devices writes a status of a respective one of the second communication devices,
each of the second communication devices further comprises a wakeup detection unit configured to detect the wakeup signal, and
each of the standby control units cancels the standby mode of a respective one of the second communication devices in accordance with the detection of the wakeup signal, and when the input packet relayed by the packet relay unit of a respective one of the second communication devices is the polling packet, causes a respective one of the second communication devices to switch to the standby mode.

7. The communication system of claim 2, wherein
when a respective one of the second communication devices is a transmitter of the write data packet or the read data packet, each of the first data transfer unit and the second data transfer units transmits a data burst end signal at an end of transfer of data having a predetermined size, and
each of the standby control units cancels the loopback mode of a respective one of the second communication devices in accordance with detection of the data burst end signal.

8. The communication system of claim 7, wherein
when a respective one of the second communication devices is a receiver of the write data packet or the read data packet, each of the first command processing unit and the second command processing units (i) transmits a wakeup signal after the transfer of the data having the predetermined size, the wakeup signal cancelling the standby mode of one or more of the second communication devices that have switched to the standby mode, and (ii) after transmitting the wakeup signal, issues a status packet for notifying a result of the reception of the write data packet or the read data packet,
each of the second communication devices further comprises a wakeup detection unit configured to detect the wakeup signal, and
each of the standby control units cancels the standby mode of a respective one of the second communication devices in accordance with the detection of the wakeup signal, and when the input packet relayed by the packet relay unit of a respective one of the second communication devices is the status packet, causes a respective one of the second communication devices to switch to the standby mode.

9. The communication system of claim 1, wherein
the first command processing unit issues a command packet,
each of the second command processing units issues a response packet, and
each of the standby control units causes a respective one of the second communication devices to switch to the standby mode when the input packet relayed by the packet relay unit of a respective one of the second communication devices is the command packet or the response packet.

10. A communication device included in a plurality of communication devices that are connected with one another in a ring via a serial link and that constitute a communication system, the serial link being made up of (i) a downlink, which is a part of the serial link that extends from a master communication device to a slave communication device, the master communication device and the slave communication device being included in the plurality of communication devices, and (ii) an uplink, which is a part of the serial link that extends from the slave communication device to the master communication device, the communication device comprising:
a command processing unit configured to issue, to a partner device that is one of the plurality of communication devices with which the communication device performs communication, (i) a standby packet for causing one or more of the plurality of communication devices connected to one of the downlink and the uplink that is not used for data packet transfer to switch to standby mode, and (ii) a loopback packet for causing one or more of the plurality of communication devices connected to one of the downlink and the uplink that is used for the data packet transfer to switch to loopback mode;
a data transfer unit configured to transfer a write data packet to be written via the downlink, and to transfer a read data packet to be read via the uplink;
a packet relay unit configured to, in accordance with a destination of a packet input to the communication device, relay the input packet to one of the plurality of communication devices that immediately succeeds the communication device in the ring; and
a standby control unit configured to (i) when the input packet relayed by the packet relay unit is the standby packet, cause the communication device to switch to the standby mode, and (ii) when the input packet relayed by the packet relay unit is the loopback packet, cause the communication device to switch to the loopback mode.

11. An integrated circuit used by a communication device included in a plurality of communication devices that are connected with one another in a ring via a serial link and that constitute a communication system, the serial link being made up of (i) a downlink, which is a part of the serial link that extends from a master communication device to a slave communication device, the master communication device and the slave communication device being included in the plurality of communication devices, and (ii) an uplink, which is a part of the serial link that extends from the slave communication device to the master communication device, the integrated circuit comprising:
a command processing circuit configured to issue, to a partner device that is one of the plurality of communication devices with which the communication device performs communication, (i) a standby packet for causing one or more of the plurality of communication devices connected to one of the downlink and the uplink that is not used for data packet transfer to switch to standby mode, and (ii) a loopback packet for causing one or more of the plurality of communication devices connected to one of the downlink and the uplink that is used for the data packet transfer to switch to loopback mode;
a data transfer circuit configured to transfer a write data packet to be written via the downlink, and to transfer a read data packet to be read via the uplink;
a packet relay circuit configured to, in accordance with a destination of a packet input thereto, relay the input packet to one of the plurality of communication devices that immediately succeeds the communication device in the ring; and
a standby control circuit configured to (i) when the input packet relayed by the packet relay circuit is the standby packet, cause the communication device to switch to the standby mode, and (ii) when the input packet relayed by the packet relay circuit is the loopback packet, cause the communication device to switch to the loopback mode.

12. A communication method used in a communication system including a first communication device and a plurality of second communication devices, the first communication device and the second communication devices being connected with one another in a ring via a serial link, wherein
the communication method causes the first communication device to perform the steps of:
when a downlink is not used for data packet transfer, issuing a standby packet to a partner device that is one of the second communication devices with which the first communication device performs communication, the downlink being a part of the serial link extending from the first communication device to the partner device; and
transmitting a write data packet to be written via the downlink and receiving a read data packet to be read via an uplink, which is a part of the serial link extending from the partner device to the first communication device, and the communication method causes each of the second communication devices to perform the steps of:
issuing the standby packet to the first communication device when the uplink is not used for the data packet transfer and a respective one of the second communication devices is the partner device;
receiving the write data packet via the downlink and transmitting the read data packet via the uplink;
in accordance with a destination of a packet input to a respective one of the second communication devices, relaying the input packet to one of the first and second communication devices that immediately succeeds a respective one of the second communication devices in the ring; and
causing a respective one of the second communication devices to switch to standby mode when the input packet that has been relayed in a respective one of the second communication devices is the standby packet.

\* \* \* \* \*